(12) United States Patent
Rolnik et al.

(10) Patent No.: US 12,105,948 B2
(45) Date of Patent: Oct. 1, 2024

(54) DIGITAL PROCESSING SYSTEMS AND METHODS FOR DISPLAY NAVIGATION MINI MAPS

(71) Applicant: Monday.com LTD., Tel Aviv (IL)

(72) Inventors: Natan Rolnik, Modiin (IL); Shani Frankel, Tel Aviv (IL); Or May Paz, Shoham (IL)

(73) Assignee: MONDAY.COM LTD., Tel Aviv (IL)

( * ) Notice: Subject to any disclaimer, the term of this patent is extended or adjusted under 35 U.S.C. 154(b) by 0 days.

(21) Appl. No.: 18/147,249

(22) Filed: Dec. 28, 2022

(65) Prior Publication Data
US 2023/0333728 A1    Oct. 19, 2023

Related U.S. Application Data

(60) Provisional application No. 63/273,453, filed on Oct. 29, 2021.

(51) Int. Cl.
*G06F 3/04855* (2022.01)
*G06F 9/451* (2018.01)

(52) U.S. Cl.
CPC .......... *G06F 3/04855* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 4,972,314 A | 11/1990 | Getzinger et al. |
| 5,220,657 A | 6/1993 | Bly et al. |
| 5,479,602 A | 12/1995 | Baecker et al. |
| 5,517,663 A | 5/1996 | Kahn |

(Continued)

FOREIGN PATENT DOCUMENTS

| | | |
|---|---|---|
| CA | 2828011 A1 | 9/2012 |
| CN | 103064833 A | 4/2013 |

(Continued)

OTHER PUBLICATIONS

D'Elessio et al., Monday.com Walkthrough 2018\All Features, Platforms & Thoughts, Mar. 1, 2018, pp. 1-55, 2018.

(Continued)

*Primary Examiner* — William L Bashore
*Assistant Examiner* — Gabriel Mercado
(74) *Attorney, Agent, or Firm* — Finnegan, Henderson, Farabow, Garrett & Dunner LLP

(57) ABSTRACT

Systems, methods, and computer-readable media for presenting groups of information on a display are disclosed. System and methods include presenting the groups in the form of a page, each group of information having an associated size, wherein a cumulative size of all groups of information is larger than a dimension of the display; receiving an initial scrolling signal for causing the presented page to scroll; and augmenting the display with a scroll bar divided into sections of differing visual effects. Each section may have a visual effect that is assigned to one group of the plurality of groups of information. A length of each section may be proportional to the associated size of the one group relative to the cumulative size of all the groups, and an order of the visual effects in the scroll bar may correspond to an order of the groups of information in the page.

20 Claims, 16 Drawing Sheets

(56) References Cited

U.S. PATENT DOCUMENTS

| | | | |
|---|---|---|---|
| 5,632,009 A | 5/1997 | Rao et al. |
| 5,657,437 A | 8/1997 | Bishop et al. |
| 5,682,469 A | 10/1997 | Linnett et al. |
| 5,696,702 A | 12/1997 | Skinner et al. |
| 5,726,701 A | 3/1998 | Needham |
| 5,787,411 A | 7/1998 | Groff et al. |
| 5,880,742 A | 3/1999 | Rao et al. |
| 5,933,145 A | 8/1999 | Meek |
| 6,016,438 A | 1/2000 | Wakayama |
| 6,016,553 A | 1/2000 | Schneider et al. |
| 6,023,695 A | 2/2000 | Osborn et al. |
| 6,034,681 A | 3/2000 | Miller et al. |
| 6,049,622 A | 4/2000 | Robb et al. |
| 6,088,707 A | 7/2000 | Bates et al. |
| 6,108,573 A | 8/2000 | Debbins et al. |
| 6,111,573 A | 8/2000 | McComb et al. |
| 6,157,381 A * | 12/2000 | Bates ................ G06F 3/04855 715/786 |
| 6,167,405 A | 12/2000 | Rosensteel, Jr. et al. |
| 6,169,534 B1 | 1/2001 | Raffel et al. |
| 6,182,127 B1 | 1/2001 | Cronin et al. |
| 6,185,582 B1 | 2/2001 | Zellweger et al. |
| 6,195,794 B1 | 2/2001 | Buxton |
| 6,222,541 B1 * | 4/2001 | Bates ................ G06F 3/0481 715/974 |
| 6,252,594 B1 * | 6/2001 | Xia ................ G06F 3/0485 715/978 |
| 6,266,067 B1 | 7/2001 | Owen et al. |
| 6,275,809 B1 | 8/2001 | Tamaki et al. |
| 6,330,022 B1 | 12/2001 | Seligmann |
| 6,377,965 B1 | 4/2002 | Hachamovitch et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,510,459 B2 | 1/2003 | Cronin, III et al. |
| 6,522,347 B1 | 2/2003 | Tsuji et al. |
| 6,527,556 B1 | 3/2003 | Koskinen |
| 6,567,830 B1 | 5/2003 | Madduri |
| 6,606,740 B1 | 8/2003 | Lynn et al. |
| 6,626,959 B1 | 9/2003 | Moise et al. |
| 6,636,242 B2 | 10/2003 | Bowman-Amuah |
| 6,647,370 B1 | 11/2003 | Fu et al. |
| 6,661,431 B1 | 12/2003 | Stuart et al. |
| 6,988,248 B1 | 1/2006 | Tang et al. |
| 7,027,997 B1 | 4/2006 | Robinson et al. |
| 7,034,860 B2 | 4/2006 | Lia et al. |
| 7,043,529 B1 | 5/2006 | Simonoff |
| 7,054,891 B2 | 5/2006 | Cole |
| 7,228,492 B1 * | 6/2007 | Graham ................ G06F 16/957 715/276 |
| 7,237,188 B1 | 6/2007 | Leung |
| 7,249,042 B1 | 7/2007 | Doerr et al. |
| 7,272,637 B1 | 9/2007 | Himmelstein |
| 7,274,375 B1 | 9/2007 | David |
| 7,379,934 B1 | 5/2008 | Forman et al. |
| 7,380,202 B1 | 5/2008 | Lindhorst et al. |
| 7,383,320 B1 | 6/2008 | Silberstein et al. |
| 7,389,473 B1 | 6/2008 | Sawicki et al. |
| 7,415,664 B2 | 8/2008 | Aureglia et al. |
| 7,417,644 B2 | 8/2008 | Cooper et al. |
| 7,461,077 B1 | 12/2008 | Greenwood |
| 7,489,976 B2 | 2/2009 | Adra |
| 7,565,270 B2 | 7/2009 | Bramwell et al. |
| 7,617,443 B2 | 11/2009 | Mills et al. |
| 7,685,152 B2 | 3/2010 | Chivukula et al. |
| 7,707,514 B2 | 4/2010 | Forstall et al. |
| 7,710,290 B2 | 5/2010 | Johnson |
| 7,747,782 B2 | 6/2010 | Hunt et al. |
| 7,770,100 B2 | 8/2010 | Chamberlain et al. |
| 7,827,476 B1 | 11/2010 | Roberts et al. |
| 7,827,615 B1 | 11/2010 | Allababidi et al. |
| 7,836,408 B1 * | 11/2010 | Ollmann ............ G06F 3/04855 707/750 |
| 7,916,157 B1 | 3/2011 | Kelley et al. |
| 7,921,360 B1 | 4/2011 | Sundermeyer et al. |
| 7,933,952 B2 | 4/2011 | Parker et al. |
| 7,945,622 B1 | 5/2011 | Pegg |
| 7,954,043 B2 | 5/2011 | Bera |
| 7,954,064 B2 | 5/2011 | Forstall et al. |
| 8,046,703 B2 | 10/2011 | Busch et al. |
| 8,060,518 B2 | 11/2011 | Timmons |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 | 1/2013 | Bansal et al. |
| 8,375,327 B2 | 2/2013 | Lorch et al. |
| 8,386,960 B1 | 2/2013 | Eismann et al. |
| 8,407,217 B1 | 3/2013 | Zhang |
| 8,413,261 B2 | 4/2013 | Nemoy et al. |
| 8,423,909 B2 | 4/2013 | Zabielski |
| 8,543,566 B2 | 9/2013 | Weissman et al. |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,621,652 B2 | 12/2013 | Slater, Jr. |
| 8,635,520 B2 | 1/2014 | Christiansen et al. |
| 8,677,448 B1 | 3/2014 | Kauffman et al. |
| 8,719,071 B2 | 5/2014 | MacIntyre et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,825,758 B2 | 9/2014 | Bailor et al. |
| 8,838,533 B2 | 9/2014 | Kwiatkowski et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,021,118 B2 | 4/2015 | John et al. |
| 9,026,897 B2 | 5/2015 | Zarras |
| 9,043,362 B2 | 5/2015 | Weissman et al. |
| 9,063,958 B2 | 6/2015 | Müller et al. |
| 9,129,234 B2 | 9/2015 | Campbell et al. |
| 9,159,246 B2 | 10/2015 | Rodriguez et al. |
| 9,172,738 B1 | 10/2015 | daCosta |
| 9,177,238 B2 | 11/2015 | Windmueller et al. |
| 9,183,303 B1 | 11/2015 | Goel et al. |
| 9,223,770 B1 | 12/2015 | Ledet |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,286,475 B2 | 3/2016 | Li et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 | 6/2016 | Simon et al. |
| 9,390,059 B1 | 7/2016 | Gur et al. |
| 9,424,287 B2 | 8/2016 | Schroth |
| 9,424,333 B1 | 8/2016 | Bisignani et al. |
| 9,424,545 B1 | 8/2016 | Lee |
| 9,430,458 B2 | 8/2016 | Rhee et al. |
| 9,449,031 B2 | 9/2016 | Barrus et al. |
| 9,495,386 B2 | 11/2016 | Tapley et al. |
| 9,519,699 B1 | 12/2016 | Kulkarni et al. |
| 9,558,172 B2 | 1/2017 | Rampson et al. |
| 9,569,511 B2 | 2/2017 | Morin |
| 9,613,086 B1 | 4/2017 | Sherman |
| 9,635,091 B1 | 4/2017 | Laukkanen et al. |
| 9,659,284 B1 | 5/2017 | Wilson et al. |
| 9,679,456 B2 | 6/2017 | East |

(56) References Cited

U.S. PATENT DOCUMENTS

| | | |
|---|---|---|
| 9,720,602 B1 | 8/2017 | Chen et al. |
| 9,727,376 B1 | 8/2017 | Bills et al. |
| 9,760,271 B2 | 9/2017 | Persaud |
| 9,794,256 B2 | 10/2017 | Kiang et al. |
| 9,798,829 B1 | 10/2017 | Baisley |
| 9,811,676 B1 | 11/2017 | Gauvin |
| 9,866,561 B2 | 1/2018 | Psenka et al. |
| 9,870,136 B2 | 1/2018 | Pourshahid |
| 10,001,908 B2 | 6/2018 | Grieve et al. |
| 10,043,296 B2 | 8/2018 | Li |
| 10,067,928 B1 | 9/2018 | Krappe |
| 10,078,668 B1 | 9/2018 | Woodrow et al. |
| 10,169,306 B2 | 1/2019 | O'Shaughnessy et al. |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |
| 10,311,080 B2 | 6/2019 | Folting et al. |
| 10,318,624 B1 | 6/2019 | Rosner et al. |
| 10,327,712 B2 | 6/2019 | Beymer et al. |
| 10,347,017 B2 | 7/2019 | Ruble et al. |
| 10,372,706 B2 | 8/2019 | Chavan et al. |
| 10,380,140 B2 | 8/2019 | Sherman |
| 10,423,758 B2 | 9/2019 | Kido et al. |
| 10,445,702 B1 | 10/2019 | Hunt |
| 10,452,360 B1 | 10/2019 | Burman et al. |
| 10,453,118 B2 | 10/2019 | Smith et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,505,825 B1 | 12/2019 | Bettaiah et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,546,001 B1 | 1/2020 | Nguyen et al. |
| 10,564,622 B1 | 2/2020 | Dean et al. |
| 10,573,407 B2 | 2/2020 | Ginsburg |
| 10,579,724 B2 | 3/2020 | Campbell et al. |
| 10,587,714 B1 | 3/2020 | Kulkarni et al. |
| 10,628,002 B1 | 4/2020 | Kang et al. |
| 10,698,594 B2 | 6/2020 | Sanches et al. |
| 10,706,061 B2 | 7/2020 | Sherman et al. |
| 10,719,220 B2 | 7/2020 | Ouellet et al. |
| 10,733,256 B2 | 8/2020 | Fickenscher et al. |
| 10,740,117 B2 | 8/2020 | Ording et al. |
| 10,747,764 B1 | 8/2020 | Plenderleith |
| 10,747,950 B2 | 8/2020 | Dang et al. |
| 10,748,312 B2 | 8/2020 | Ruble et al. |
| 10,754,688 B2 | 8/2020 | Powell |
| 10,761,691 B2 | 9/2020 | Anzures et al. |
| 10,795,555 B2 | 10/2020 | Burke et al. |
| 10,809,696 B1 | 10/2020 | Principato |
| 10,817,660 B2 | 10/2020 | Rampson et al. |
| D910,077 S | 2/2021 | Naroshevitch et al. |
| 10,963,578 B2 | 3/2021 | More et al. |
| 11,010,371 B1 | 5/2021 | Slomka et al. |
| 11,030,259 B2 | 6/2021 | Mullins et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 11,086,894 B1 | 8/2021 | Srivastava et al. |
| 11,144,854 B1 | 10/2021 | Mouawad |
| 11,222,167 B2 | 1/2022 | Gehrmann et al. |
| 11,243,688 B1 | 2/2022 | Remy et al. |
| 11,429,384 B1 | 8/2022 | Navert et al. |
| 11,443,390 B1 | 9/2022 | Caligaris et al. |
| 11,620,615 B2 | 4/2023 | Jiang et al. |
| 11,682,091 B2 | 6/2023 | Sukman et al. |
| 2001/0008998 A1 | 7/2001 | Tamaki et al. |
| 2001/0032248 A1 | 10/2001 | Krafchin |
| 2001/0039551 A1 | 11/2001 | Saito et al. |
| 2002/0002459 A1 | 1/2002 | Lewis et al. |
| 2002/0065848 A1 | 5/2002 | Walker et al. |
| 2002/0065849 A1 | 5/2002 | Ferguson et al. |
| 2002/0065880 A1 | 5/2002 | Hasegawa et al. |
| 2002/0069207 A1 | 6/2002 | Alexander et al. |
| 2002/0075309 A1 | 6/2002 | Michelman et al. |
| 2002/0082892 A1 | 6/2002 | Raffel et al. |
| 2002/0099777 A1 | 7/2002 | Gupta et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0052912 A1 | 3/2003 | Bowman et al. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0101416 A1 | 5/2003 | McInnes et al. |
| 2003/0135558 A1 | 7/2003 | Bellotti et al. |
| 2003/0137536 A1 | 7/2003 | Hugh |
| 2003/0187864 A1 | 10/2003 | McGoveran |
| 2003/0200215 A1 | 10/2003 | Chen et al. |
| 2003/0204490 A1 | 10/2003 | Kasriel |
| 2003/0233224 A1 | 12/2003 | Marchisio et al. |
| 2004/0032432 A1 | 2/2004 | Baynger |
| 2004/0078373 A1 | 4/2004 | Ghoneimy et al. |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0139400 A1 | 7/2004 | Allam et al. |
| 2004/0162833 A1 | 8/2004 | Jones et al. |
| 2004/0172592 A1 | 9/2004 | Collie et al. |
| 2004/0212615 A1 | 10/2004 | Uthe |
| 2004/0215443 A1 | 10/2004 | Hatton |
| 2004/0230940 A1 | 11/2004 | Cooper et al. |
| 2004/0268227 A1 | 12/2004 | Brid |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0063615 A1 | 3/2005 | Siegel et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0091596 A1 | 4/2005 | Anthony et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0165600 A1 | 7/2005 | Kasravi et al. |
| 2005/0171881 A1 | 8/2005 | Ghassemieh et al. |
| 2005/0210371 A1 | 9/2005 | Pollock et al. |
| 2005/0216830 A1 | 9/2005 | Turner et al. |
| 2005/0228250 A1 | 10/2005 | Bitter et al. |
| 2005/0251021 A1 | 11/2005 | Kaufman et al. |
| 2005/0257204 A1 | 11/2005 | Bryant et al. |
| 2005/0278297 A1 | 12/2005 | Nelson |
| 2005/0289170 A1 | 12/2005 | Brown et al. |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0013462 A1 | 1/2006 | Sadikali |
| 2006/0015499 A1 | 1/2006 | Clissold et al. |
| 2006/0015806 A1 | 1/2006 | Wallace |
| 2006/0031148 A1 | 2/2006 | O'Dell et al. |
| 2006/0031764 A1 | 2/2006 | Keyser et al. |
| 2006/0036568 A1 | 2/2006 | Moore et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0085744 A1 | 4/2006 | Hays et al. |
| 2006/0090169 A1 | 4/2006 | Daniels et al. |
| 2006/0101324 A1 | 5/2006 | Goldberg et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0129913 A1 | 6/2006 | Vigesaa et al. |

(56) References Cited

U.S. PATENT DOCUMENTS

| | | |
|---|---|---|
| 2006/0136828 A1 | 6/2006 | Asano |
| 2006/0150090 A1 | 7/2006 | Swamidass |
| 2006/0173908 A1 | 8/2006 | Browning et al. |
| 2006/0190313 A1 | 8/2006 | Lu |
| 2006/0212299 A1 | 9/2006 | Law |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0236246 A1 | 10/2006 | Bono et al. |
| 2006/0250369 A1 | 11/2006 | Keim |
| 2006/0253205 A1 | 11/2006 | Gardiner |
| 2006/0271574 A1 | 11/2006 | Villaron et al. |
| 2006/0287998 A1 | 12/2006 | Folting et al. |
| 2006/0294451 A1 | 12/2006 | Kelkar et al. |
| 2007/0027932 A1 | 2/2007 | Thibeault |
| 2007/0032993 A1 | 2/2007 | Yamaguchi et al. |
| 2007/0033531 A1 | 2/2007 | Marsh |
| 2007/0050322 A1 | 3/2007 | Vigesaa et al. |
| 2007/0050379 A1 | 3/2007 | Day et al. |
| 2007/0073899 A1 | 3/2007 | Judge et al. |
| 2007/0092048 A1 | 4/2007 | Chelstrom et al. |
| 2007/0094607 A1 | 4/2007 | Morgan et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0150389 A1 | 6/2007 | Aamodt et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0192729 A1* | 8/2007 | Downs .............. G06F 3/04855 715/786 |
| 2007/0220119 A1 | 9/2007 | Himmelstein |
| 2007/0233647 A1 | 10/2007 | Rawat et al. |
| 2007/0239746 A1 | 10/2007 | Masselle et al. |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034307 A1 | 2/2008 | Cisler et al. |
| 2008/0034314 A1 | 2/2008 | Louch et al. |
| 2008/0052291 A1 | 2/2008 | Bender |
| 2008/0059312 A1 | 3/2008 | Gern et al. |
| 2008/0059539 A1 | 3/2008 | Chin et al. |
| 2008/0065460 A1 | 3/2008 | Raynor |
| 2008/0077530 A1 | 3/2008 | Banas et al. |
| 2008/0097748 A1 | 4/2008 | Haley et al. |
| 2008/0104091 A1 | 5/2008 | Chin |
| 2008/0126389 A1 | 5/2008 | Mush et al. |
| 2008/0133736 A1 | 6/2008 | Wensley et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0183593 A1 | 7/2008 | Dierks |
| 2008/0195948 A1 | 8/2008 | Bauer |
| 2008/0209318 A1 | 8/2008 | Allsop et al. |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0256429 A1 | 10/2008 | Penner et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0007157 A1 | 1/2009 | Ward et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0043814 A1 | 2/2009 | Faris et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0075694 A1* | 3/2009 | Kim .................. G06F 3/016 455/556.1 |
| 2009/0077164 A1 | 3/2009 | Phillips et al. |
| 2009/0077217 A1 | 3/2009 | McFarland et al. |
| 2009/0083140 A1 | 3/2009 | Phan |
| 2009/0094514 A1 | 4/2009 | Dargahi et al. |
| 2009/0113310 A1 | 4/2009 | Appleyard et al. |
| 2009/0129596 A1 | 5/2009 | Chavez et al. |
| 2009/0132331 A1 | 5/2009 | Cartledge et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0192787 A1 | 7/2009 | Roon |
| 2009/0198715 A1 | 8/2009 | Barbarek |
| 2009/0222760 A1 | 9/2009 | Halverson et al. |
| 2009/0248710 A1 | 10/2009 | McCormack et al. |
| 2009/0256972 A1 | 10/2009 | Ramaswamy et al. |
| 2009/0262690 A1 | 10/2009 | Breuer et al. |
| 2009/0271696 A1 | 10/2009 | Bailor et al. |
| 2009/0276692 A1 | 11/2009 | Rosner |
| 2009/0292690 A1 | 11/2009 | Culbert |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319623 A1 | 12/2009 | Srinivasan et al. |
| 2009/0319882 A1 | 12/2009 | Morrison et al. |
| 2009/0327240 A1 | 12/2009 | Meehan et al. |
| 2009/0327301 A1 | 12/2009 | Lees et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0031135 A1 | 2/2010 | Naghshin et al. |
| 2010/0070845 A1 | 3/2010 | Facemire et al. |
| 2010/0070895 A1 | 3/2010 | Messer |
| 2010/0082705 A1 | 4/2010 | Ramesh et al. |
| 2010/0083164 A1 | 4/2010 | Martin et al. |
| 2010/0088636 A1 | 4/2010 | Yerkes et al. |
| 2010/0095219 A1 | 4/2010 | Stachowiak et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0205521 A1 | 8/2010 | Folting |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241968 A1 | 9/2010 | Tarara et al. |
| 2010/0241972 A1 | 9/2010 | Spataro et al. |
| 2010/0241990 A1 | 9/2010 | Gabriel et al. |
| 2010/0251090 A1 | 9/2010 | Chamberlain et al. |
| 2010/0251386 A1 | 9/2010 | Gilzean et al. |
| 2010/0257015 A1 | 10/2010 | Molander |
| 2010/0262625 A1 | 10/2010 | Pittenger |
| 2010/0268705 A1 | 10/2010 | Douglas et al. |
| 2010/0268773 A1 | 10/2010 | Hunt et al. |
| 2010/0287163 A1 | 11/2010 | Sridhar et al. |
| 2010/0287221 A1 | 11/2010 | Battepati et al. |
| 2010/0313119 A1 | 12/2010 | Baldwin et al. |
| 2010/0324964 A1 | 12/2010 | Callanan et al. |
| 2010/0332973 A1 | 12/2010 | Kloiber et al. |
| 2011/0010340 A1 | 1/2011 | Hung et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |

(56) References Cited

U.S. PATENT DOCUMENTS

| | | |
|---|---|---|
| 2011/0154192 A1 | 6/2011 | Yang et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0209150 A1 | 8/2011 | Hammond et al. |
| 2011/0219321 A1 | 9/2011 | Gonzalez Veron et al. |
| 2011/0225525 A1 | 9/2011 | Chasman et al. |
| 2011/0231273 A1 | 9/2011 | Buchheit |
| 2011/0238716 A1 | 9/2011 | Amir et al. |
| 2011/0258040 A1 | 10/2011 | Gnanasambandam |
| 2011/0288900 A1 | 11/2011 | McQueen et al. |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036423 A1 | 2/2012 | Haynes et al. |
| 2012/0036462 A1 | 2/2012 | Schwartz et al. |
| 2012/0050802 A1 | 3/2012 | Masuda |
| 2012/0066587 A1 | 3/2012 | Zhou et al. |
| 2012/0072821 A1 | 3/2012 | Bowling |
| 2012/0079408 A1 | 3/2012 | Rohwer |
| 2012/0081762 A1 | 4/2012 | Yamada |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089610 A1 | 4/2012 | Agrawal et al. |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman |
| 2012/0130907 A1 | 5/2012 | Thompson et al. |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0229867 A1 | 9/2012 | Takagi |
| 2012/0233150 A1 | 9/2012 | Naim et al. |
| 2012/0233533 A1 | 9/2012 | Yücel et al. |
| 2012/0234907 A1 | 9/2012 | Clark et al. |
| 2012/0236368 A1 | 9/2012 | Uchida et al. |
| 2012/0239454 A1 | 9/2012 | Taix et al. |
| 2012/0244891 A1 | 9/2012 | Appleton |
| 2012/0246170 A1 | 9/2012 | Lantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0284197 A1 | 11/2012 | Strick et al. |
| 2012/0297307 A1 | 11/2012 | Rider et al. |
| 2012/0300931 A1 | 11/2012 | Ollikainen et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2012/0311672 A1 | 12/2012 | Connor et al. |
| 2012/0324348 A1* | 12/2012 | Rounthwaite ......... G06F 40/103 715/256 |
| 2013/0015954 A1 | 1/2013 | Thorne et al. |
| 2013/0018952 A1 | 1/2013 | McConnell et al. |
| 2013/0018953 A1 | 1/2013 | McConnell et al. |
| 2013/0018960 A1 | 1/2013 | Knysz et al. |
| 2013/0024418 A1 | 1/2013 | Strick et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0054514 A1 | 2/2013 | Barrett-Kahn et al. |
| 2013/0055113 A1 | 2/2013 | Chazin et al. |
| 2013/0059598 A1 | 3/2013 | Miyagi et al. |
| 2013/0063490 A1 | 3/2013 | Zaman et al. |
| 2013/0086460 A1 | 4/2013 | Folting et al. |
| 2013/0090969 A1 | 4/2013 | Rivere |
| 2013/0097490 A1 | 4/2013 | Kotler et al. |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |
| 2013/0179209 A1 | 7/2013 | Milosevich |
| 2013/0211866 A1 | 8/2013 | Gordon et al. |
| 2013/0212197 A1 | 8/2013 | Karlson |
| 2013/0212234 A1 | 8/2013 | Bartlett et al. |
| 2013/0215475 A1 | 8/2013 | Noguchi |
| 2013/0238363 A1 | 9/2013 | Ohta et al. |
| 2013/0238968 A1 | 9/2013 | Barrus |
| 2013/0246384 A1 | 9/2013 | Victor |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2013/0307997 A1 | 11/2013 | O'Keefe et al. |
| 2013/0318424 A1 | 11/2013 | Boyd |
| 2013/0339051 A1 | 12/2013 | Dobrean |
| 2014/0002863 A1 | 1/2014 | Hasegawa et al. |
| 2014/0006326 A1 | 1/2014 | Bazanov |
| 2014/0012616 A1 | 1/2014 | Moshenek |
| 2014/0019842 A1 | 1/2014 | Montagna et al. |
| 2014/0033307 A1 | 1/2014 | Schmidtler |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0058801 A1 | 2/2014 | Deodhar et al. |
| 2014/0059017 A1 | 2/2014 | Chaney et al. |
| 2014/0068403 A1 | 3/2014 | Bhargav et al. |
| 2014/0074545 A1 | 3/2014 | Minder et al. |
| 2014/0075301 A1 | 3/2014 | Mihara |
| 2014/0078557 A1 | 3/2014 | Hasegawa et al. |
| 2014/0082525 A1 | 3/2014 | Kass et al. |
| 2014/0095237 A1 | 4/2014 | Ehrler et al. |
| 2014/0101527 A1 | 4/2014 | Suciu |
| 2014/0108985 A1 | 4/2014 | Scott et al. |
| 2014/0109012 A1 | 4/2014 | Choudhary et al. |
| 2014/0111516 A1 | 4/2014 | Hall et al. |
| 2014/0115515 A1 | 4/2014 | Adams et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137003 A1 | 5/2014 | Peters et al. |
| 2014/0137144 A1 | 5/2014 | Järvenpää et al. |
| 2014/0172475 A1 | 6/2014 | Olliphant et al. |
| 2014/0173401 A1 | 6/2014 | Oshlag et al. |
| 2014/0181155 A1 | 6/2014 | Homsany |
| 2014/0188748 A1 | 7/2014 | Cavoue et al. |
| 2014/0195933 A1 | 7/2014 | Rao DV |
| 2014/0214404 A1 | 7/2014 | Kalia et al. |
| 2014/0215303 A1 | 7/2014 | Grigorovitch et al. |
| 2014/0229816 A1 | 8/2014 | Yakub |
| 2014/0240735 A1 | 8/2014 | Salgado |
| 2014/0249877 A1 | 9/2014 | Hull et al. |
| 2014/0257568 A1 | 9/2014 | Czaja et al. |
| 2014/0278638 A1 | 9/2014 | Kreuzkamp et al. |
| 2014/0278720 A1 | 9/2014 | Taguchi |
| 2014/0280287 A1 | 9/2014 | Ganti et al. |
| 2014/0280377 A1 | 9/2014 | Frew |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0310345 A1 | 10/2014 | Megiddo et al. |
| 2014/0324497 A1 | 10/2014 | Verma et al. |
| 2014/0324501 A1 | 10/2014 | Davidow et al. |
| 2014/0325552 A1 | 10/2014 | Evans et al. |

(56) References Cited

U.S. PATENT DOCUMENTS

| | | |
|---|---|---|
| 2014/0365938 A1 | 12/2014 | Black et al. |
| 2014/0372856 A1 | 12/2014 | Radakovitz et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0033149 A1 | 1/2015 | Kuchoor |
| 2015/0035918 A1 | 2/2015 | Matsumoto et al. |
| 2015/0039387 A1 | 2/2015 | Akahoshi et al. |
| 2015/0046209 A1 | 2/2015 | Choe |
| 2015/0067556 A1 | 3/2015 | Tibrewal et al. |
| 2015/0074721 A1 | 3/2015 | Fishman et al. |
| 2015/0074728 A1 | 3/2015 | Chai et al. |
| 2015/0088822 A1 | 3/2015 | Raja et al. |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0142676 A1 | 5/2015 | McGinnis et al. |
| 2015/0142829 A1 | 5/2015 | Lee et al. |
| 2015/0153943 A1 | 6/2015 | Wang |
| 2015/0154660 A1 | 6/2015 | Weald et al. |
| 2015/0169514 A1 | 6/2015 | Sah et al. |
| 2015/0169531 A1 | 6/2015 | Campbell et al. |
| 2015/0178657 A1 | 6/2015 | Kleehammer et al. |
| 2015/0188964 A1 | 7/2015 | Sharma et al. |
| 2015/0205830 A1 | 7/2015 | Bastide et al. |
| 2015/0212717 A1 | 7/2015 | Nair et al. |
| 2015/0220491 A1 | 8/2015 | Cochrane et al. |
| 2015/0234887 A1 | 8/2015 | Greene et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0262121 A1 | 9/2015 | Riel-Dalpe et al. |
| 2015/0278699 A1 | 10/2015 | Danielsson |
| 2015/0281292 A1 | 10/2015 | Murayama et al. |
| 2015/0295877 A1 | 10/2015 | Roman |
| 2015/0310126 A1 | 10/2015 | Steiner et al. |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370776 A1 | 12/2015 | New |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2015/0379472 A1 | 12/2015 | Gilmour et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0035546 A1 | 2/2016 | Platt et al. |
| 2016/0041736 A1* | 2/2016 | Schulz ............... G06F 3/04855 |
| | | 715/772 |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0068960 A1 | 3/2016 | Jung et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0098574 A1 | 4/2016 | Bargagni |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0196310 A1 | 7/2016 | Dutta |
| 2016/0210572 A1 | 7/2016 | Shaaban et al. |
| 2016/0224532 A1 | 8/2016 | Miller et al. |
| 2016/0224676 A1 | 8/2016 | Miller et al. |
| 2016/0224939 A1 | 8/2016 | Chen et al. |
| 2016/0231915 A1 | 8/2016 | Nhan et al. |
| 2016/0232489 A1 | 8/2016 | Skaaksrud |
| 2016/0246490 A1 | 8/2016 | Cabral |
| 2016/0253982 A1 | 9/2016 | Cheung et al. |
| 2016/0259856 A1 | 9/2016 | Ananthapur et al. |
| 2016/0275150 A1 | 9/2016 | Bournonnais et al. |
| 2016/0292206 A1 | 10/2016 | Ruiz Velazquez et al. |
| 2016/0299655 A1 | 10/2016 | Migos et al. |
| 2016/0308963 A1 | 10/2016 | Kung |
| 2016/0321235 A1 | 11/2016 | He et al. |
| 2016/0321604 A1 | 11/2016 | Imaeda et al. |
| 2016/0335302 A1 | 11/2016 | Teodorescu et al. |
| 2016/0335303 A1 | 11/2016 | Madhalam et al. |
| 2016/0335604 A1 | 11/2016 | Reminick et al. |
| 2016/0335731 A1 | 11/2016 | Hall |
| 2016/0335903 A1 | 11/2016 | Mendoza |
| 2016/0344828 A1 | 11/2016 | Häusler et al. |
| 2016/0350950 A1 | 12/2016 | Ritchie et al. |
| 2016/0381099 A1 | 12/2016 | Keslin et al. |
| 2017/0017779 A1 | 1/2017 | Huang et al. |
| 2017/0031967 A1 | 2/2017 | Chavan et al. |
| 2017/0041296 A1 | 2/2017 | Ford et al. |
| 2017/0052937 A1 | 2/2017 | Sirven et al. |
| 2017/0061342 A1 | 3/2017 | Lore et al. |
| 2017/0061360 A1 | 3/2017 | Rucker et al. |
| 2017/0061820 A1 | 3/2017 | Firoozbakhsh |
| 2017/0063722 A1 | 3/2017 | Cropper et al. |
| 2017/0075557 A1 | 3/2017 | Noble et al. |
| 2017/0076101 A1 | 3/2017 | Kochhar et al. |
| 2017/0090734 A1 | 3/2017 | Fitzpatrick |
| 2017/0090736 A1 | 3/2017 | King et al. |
| 2017/0091337 A1 | 3/2017 | Patterson |
| 2017/0093876 A1 | 3/2017 | Feng et al. |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0124740 A1 | 5/2017 | Campbell et al. |
| 2017/0126772 A1 | 5/2017 | Campbell et al. |
| 2017/0132296 A1 | 5/2017 | Ding |
| 2017/0132652 A1 | 5/2017 | Kedzlie et al. |
| 2017/0139874 A1 | 5/2017 | Chin |
| 2017/0139884 A1 | 5/2017 | Bendig et al. |
| 2017/0139891 A1 | 5/2017 | Ah-Soon et al. |
| 2017/0139992 A1 | 5/2017 | Morin |
| 2017/0140047 A1 | 5/2017 | Bendig et al. |
| 2017/0140219 A1 | 5/2017 | King et al. |
| 2017/0153771 A1 | 6/2017 | Chu |
| 2017/0161246 A1 | 6/2017 | Klima |
| 2017/0177556 A1* | 6/2017 | Fay .................. G06F 3/0484 |
| 2017/0177888 A1 | 6/2017 | Arora et al. |
| 2017/0185575 A1 | 6/2017 | Sood et al. |
| 2017/0185668 A1 | 6/2017 | Convertino et al. |
| 2017/0200122 A1 | 7/2017 | Edson et al. |
| 2017/0206366 A1* | 7/2017 | Fay .................. G06F 40/106 |
| 2017/0212924 A1 | 7/2017 | Semlani et al. |
| 2017/0220813 A1 | 8/2017 | Mullins et al. |
| 2017/0221072 A1 | 8/2017 | AthuluruTlrumala et al. |
| 2017/0228421 A1 | 8/2017 | Sharma et al. |
| 2017/0228445 A1 | 8/2017 | Chiu et al. |
| 2017/0228460 A1 | 8/2017 | Amel et al. |
| 2017/0229152 A1 | 8/2017 | Loganathan et al. |
| 2017/0236081 A1 | 8/2017 | Grady Smith et al. |
| 2017/0242921 A1 | 8/2017 | Rota |
| 2017/0257517 A1 | 9/2017 | Panda |
| 2017/0262786 A1 | 9/2017 | Khasis |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0277620 A1 | 9/2017 | Kadioglu |
| 2017/0277669 A1 | 9/2017 | Sekharan |
| 2017/0285879 A1 | 10/2017 | Pilkington et al. |
| 2017/0285890 A1 | 10/2017 | Dolman |
| 2017/0289619 A1 | 10/2017 | Xu et al. |
| 2017/0301039 A1 | 10/2017 | Dyer et al. |
| 2017/0315683 A1 | 11/2017 | Boucher et al. |
| 2017/0315974 A1 | 11/2017 | Kong et al. |
| 2017/0315979 A1 | 11/2017 | Boucher et al. |
| 2017/0322963 A1 | 11/2017 | Ramamurthi et al. |
| 2017/0324692 A1 | 11/2017 | Zhou |
| 2017/0329479 A1 | 11/2017 | Rauschenbach et al. |
| 2017/0351252 A1 | 12/2017 | Kleifges et al. |

(56) References Cited

U.S. PATENT DOCUMENTS

| | | |
|---|---|---|
| 2017/0372442 A1 | 12/2017 | Mejias |
| 2017/0374205 A1 | 12/2017 | Panda |
| 2018/0011827 A1 | 1/2018 | Avery et al. |
| 2018/0025084 A1 | 1/2018 | Conlan et al. |
| 2018/0026954 A1 | 1/2018 | Toepke et al. |
| 2018/0032492 A1 | 2/2018 | Altshuller et al. |
| 2018/0032570 A1 | 2/2018 | Miller et al. |
| 2018/0039651 A1 | 2/2018 | Tobin et al. |
| 2018/0055434 A1 | 3/2018 | Cheung et al. |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081505 A1 | 3/2018 | Ron et al. |
| 2018/0081863 A1 | 3/2018 | Bathla |
| 2018/0081868 A1 | 3/2018 | Willcock et al. |
| 2018/0088753 A1 | 3/2018 | Viégas et al. |
| 2018/0088989 A1 | 3/2018 | Nield et al. |
| 2018/0089299 A1 | 3/2018 | Collins et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0121028 A1* | 5/2018 | Kuscher ............... G06F 3/04845 |
| 2018/0121994 A1 | 5/2018 | Matsunaga et al. |
| 2018/0128636 A1 | 5/2018 | Zhou |
| 2018/0129651 A1 | 5/2018 | Latvala et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0157633 A1 | 6/2018 | He et al. |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0189734 A1 | 7/2018 | Newhouse et al. |
| 2018/0210936 A1 | 7/2018 | Reynolds et al. |
| 2018/0225270 A1 | 8/2018 | Bhide et al. |
| 2018/0260371 A1 | 9/2018 | Theodore et al. |
| 2018/0260435 A1 | 9/2018 | Xu |
| 2018/0262705 A1 | 9/2018 | Park et al. |
| 2018/0276417 A1 | 9/2018 | Cerezo |
| 2018/0285918 A1 | 10/2018 | Staggs |
| 2018/0293217 A1 | 10/2018 | Callaghan |
| 2018/0293587 A1 | 10/2018 | Oda |
| 2018/0293669 A1 | 10/2018 | Jackson et al. |
| 2018/0329930 A1 | 11/2018 | Eberlein et al. |
| 2018/0330320 A1 | 11/2018 | Kohli |
| 2018/0357305 A1 | 12/2018 | Kinast et al. |
| 2018/0365429 A1 | 12/2018 | Segal |
| 2018/0367484 A1 | 12/2018 | Rodriguez et al. |
| 2018/0373434 A1 | 12/2018 | Switzer et al. |
| 2018/0373757 A1 | 12/2018 | Schukovets et al. |
| 2019/0005094 A1 | 1/2019 | Yi et al. |
| 2019/0011310 A1 | 1/2019 | Turnbull et al. |
| 2019/0012342 A1 | 1/2019 | Cohn |
| 2019/0034395 A1 | 1/2019 | Curry et al. |
| 2019/0036989 A1 | 1/2019 | Eirinberg et al. |
| 2019/0042628 A1 | 2/2019 | Rajpara |
| 2019/0050445 A1 | 2/2019 | Griffith et al. |
| 2019/0050466 A1 | 2/2019 | Kim et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0068703 A1 | 2/2019 | Vora et al. |
| 2019/0073350 A1 | 3/2019 | Shiotani |
| 2019/0095413 A1 | 3/2019 | Davis et al. |
| 2019/0097909 A1 | 3/2019 | Puri et al. |
| 2019/0108046 A1 | 4/2019 | Spencer-Harper et al. |
| 2019/0113935 A1 | 4/2019 | Kuo et al. |
| 2019/0114308 A1 | 4/2019 | Hancock |
| 2019/0114589 A1 | 4/2019 | Voss et al. |
| 2019/0123924 A1 | 4/2019 | Embiricos et al. |
| 2019/0130611 A1 | 5/2019 | Black et al. |
| 2019/0138583 A1 | 5/2019 | Silk et al. |
| 2019/0138588 A1 | 5/2019 | Silk et al. |
| 2019/0138653 A1 | 5/2019 | Roller et al. |
| 2019/0147030 A1 | 5/2019 | Stein et al. |
| 2019/0155821 A1 | 5/2019 | Dirisala |
| 2019/0179501 A1 | 6/2019 | Seeley et al. |
| 2019/0199823 A1 | 6/2019 | Underwood et al. |
| 2019/0208058 A1 | 7/2019 | Dvorkin et al. |
| 2019/0213557 A1 | 7/2019 | Dotan-Cohen et al. |
| 2019/0220161 A1 | 7/2019 | Loftus et al. |
| 2019/0236188 A1 | 8/2019 | McKenna |
| 2019/0243879 A1 | 8/2019 | Harley et al. |
| 2019/0251884 A1 | 8/2019 | Burns et al. |
| 2019/0258461 A1 | 8/2019 | Li et al. |
| 2019/0258706 A1 | 8/2019 | Li et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0325012 A1 | 10/2019 | Delaney et al. |
| 2019/0327294 A1 | 10/2019 | Subramani Nadar et al. |
| 2019/0340550 A1 | 11/2019 | Denger et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2019/0377791 A1 | 12/2019 | Abou Mahmoud et al. |
| 2019/0391707 A1 | 12/2019 | Ristow et al. |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0019548 A1 | 1/2020 | Agnew et al. |
| 2020/0019595 A1 | 1/2020 | Azua |
| 2020/0026352 A1 | 1/2020 | Wang et al. |
| 2020/0026397 A1 | 1/2020 | Wohlstadter et al. |
| 2020/0042648 A1 | 2/2020 | Rao |
| 2020/0050696 A1 | 2/2020 | Mowatt et al. |
| 2020/0053176 A1 | 2/2020 | Jimenez et al. |
| 2020/0125574 A1 | 4/2020 | Ghoshal et al. |
| 2020/0134002 A1 | 4/2020 | Tung et al. |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0175094 A1 | 6/2020 | Palmer |
| 2020/0176089 A1 | 6/2020 | Jones et al. |
| 2020/0192785 A1 | 6/2020 | Chen |
| 2020/0193388 A1 | 6/2020 | Tran-Kiem et al. |
| 2020/0247661 A1 | 8/2020 | Rao et al. |
| 2020/0265112 A1 | 8/2020 | Fox et al. |
| 2020/0279315 A1 | 9/2020 | Manggala |
| 2020/0293616 A1 | 9/2020 | Nelson et al. |
| 2020/0301678 A1 | 9/2020 | Burman et al. |
| 2020/0301902 A1 | 9/2020 | Maloy et al. |
| 2020/0310835 A1 | 10/2020 | Momchilov |
| 2020/0326824 A1* | 10/2020 | Alonso ............... G06F 3/04883 |
| 2020/0327244 A1 | 10/2020 | Blass et al. |
| 2020/0334019 A1 | 10/2020 | Bosworth et al. |
| 2020/0348809 A1 | 11/2020 | Drescher |
| 2020/0349320 A1 | 11/2020 | Owens |
| 2020/0356740 A1 | 11/2020 | Principato |
| 2020/0356873 A1 | 11/2020 | Nawrocke et al. |
| 2020/0374146 A1 | 11/2020 | Chhabra et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2020/0409949 A1 | 12/2020 | Saxena et al. |
| 2020/0410395 A1 | 12/2020 | Ray et al. |
| 2021/0014136 A1 | 1/2021 | Rath |
| 2021/0019287 A1 | 1/2021 | Prasad et al. |
| 2021/0021603 A1 | 1/2021 | Gibbons |
| 2021/0034058 A1 | 2/2021 | Subramanian et al. |
| 2021/0035069 A1 | 2/2021 | Parikh |
| 2021/0042796 A1 | 2/2021 | Khoury et al. |
| 2021/0049524 A1 | 2/2021 | Nachum et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0065203 A1 | 3/2021 | Billigmeier et al. |
| 2021/0072883 A1 | 3/2021 | Migunova et al. |
| 2021/0073526 A1 | 3/2021 | Zeng et al. |
| 2021/0084120 A1 | 3/2021 | Fisher et al. |

(56) References Cited

U.S. PATENT DOCUMENTS

| | | |
|---|---|---|
| 2021/0124749 A1 | 4/2021 | Suzuki et al. |
| 2021/0124872 A1 | 4/2021 | Lereya |
| 2021/0136027 A1 | 5/2021 | Barbitta et al. |
| 2021/0149553 A1 | 5/2021 | Lereya et al. |
| 2021/0149688 A1 | 5/2021 | Newell et al. |
| 2021/0149925 A1 | 5/2021 | Mann et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0174006 A1 | 6/2021 | Stokes |
| 2021/0192126 A1 | 6/2021 | Gehrmann et al. |
| 2021/0248311 A1 | 8/2021 | Helft et al. |
| 2021/0257065 A1 | 8/2021 | Mander et al. |
| 2021/0264220 A1 | 8/2021 | Wei et al. |
| 2021/0326519 A1 | 10/2021 | Lin et al. |
| 2021/0328888 A1 | 10/2021 | Rath |
| 2021/0342785 A1 | 11/2021 | Mann et al. |
| 2021/0365446 A1 | 11/2021 | Srivastava et al. |
| 2021/0397585 A1 | 12/2021 | Seward |
| 2022/0099454 A1* | 3/2022 | Decrop .............. G01C 21/3691 |
| 2022/0121325 A1* | 4/2022 | Roberts ................. G06F 3/0481 |
| 2022/0121478 A1 | 4/2022 | Chivukula et al. |
| 2022/0221591 A1 | 7/2022 | Smith et al. |
| 2022/0291666 A1 | 9/2022 | Cella et al. |
| 2023/0153651 A1 | 5/2023 | Bi et al. |
| 2023/0316382 A1 | 10/2023 | Faricy et al. |
| 2023/0419161 A1 | 12/2023 | Dines |
| 2024/0046142 A1 | 2/2024 | Marks et al. |
| 2024/0053727 A1 | 2/2024 | Timisescu et al. |

FOREIGN PATENT DOCUMENTS

| | | |
|---|---|---|
| CN | 107123424 A | 9/2017 |
| CN | 107422666 A | 12/2017 |
| CN | 107623596 A | 1/2018 |
| CN | 107885656 A | 4/2018 |
| CN | 108717428 A | 10/2018 |
| CN | 112929172 A | 6/2021 |
| EP | 3443466 B1 | 12/2021 |
| KR | 20150100760 | 9/2015 |
| KR | 20220016276 A | 2/2022 |
| WO | WO 2004100015 A2 | 11/2004 |
| WO | WO 2006116580 A2 | 11/2006 |
| WO | WO 2008109541 A1 | 9/2008 |
| WO | 2014088393 A1 | 6/2014 |
| WO | WO 2017202159 A1 | 11/2017 |
| WO | 2018023798 A1 | 2/2018 |
| WO | 2018042424 A1 | 3/2018 |
| WO | 2020139865 A1 | 7/2020 |
| WO | WO 2020187408 A1 | 9/2020 |
| WO | WO 2021096944 A1 | 5/2021 |
| WO | WO 2021144656 A1 | 7/2021 |
| WO | WO 2021161104 A1 | 8/2021 |
| WO | WO 2021220058 A1 | 11/2021 |
| WO | 2022153122 A1 | 7/2022 |

OTHER PUBLICATIONS

Rordigo et al., Project Management with Monday.com: a 101 Introduction; Jul. 22, 2019, pp. 1-21, 2019.

International Search Report and Written Opinion of the International Searching Authority in PCT/IB2020/000658, mailed Nov. 11, 2020 (12 pages).

International Search Report in PCT/IB2020/000974, mailed May 3, 2021 (19 pages).

International Search Report in PCT/IB2021/000090 dated Jul. 27, 2021.

ShowMyPC, "Switch Presenter While Using ShowMyPC"; web archive.org; Aug. 20, 2016.

International Search Report and Written Opinion of the International Search Authority in PCT/IB2020/000024, mailed May 3, 2021 (13 pages).

"Pivot table—Wikipedia"; URL: https://en.wikepedia.org/w/index.php?title=Pivot_table&oldid=857163289, originally retrieve on Oct. 23, 2019; retrieved on Jul. 16, 2021.

Vishal Singh, "A Theoretical Framework of a BIM-based Multi-Disciplinary Collaboration Platform", Nov. 5, 2020, Automation in Construction, 20 (2011), pp. 134-144 (Year: 2011).

Edward A. Stohr, Workflow Automation: Overview and Research Issues, 2001, Information Systems Frontiers 3:3, pp. 281-296 (Year: 2001).

International Search Report and Written Opinion of the International Search Authority in PCT/IB2021/000297, mailed Oct. 12, 2021 (20 pages).

Dapulse.com "features".extracted from web.archive.or/web/2014091818421/https://dapulse.com/features; Sep. 2014 (Year: 2014).

Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm.org/doi/pdf/10.5555/2831373.2831394> 3 Pages (127-129) (Year: 2015).

Isaiah Pinchas et al., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).

Sajjad Bahrebar et al., "A Novel Type-2 Fuzzy Logic for Improved Risk Analysis of Proton Exchange Membrane Fuel Cells in Marine Power Systems Application", Energies, 11, 721, pp. 1-16, Mar. 22, 2018.

Pedersen et al., "Tivoli: an electronic whiteboard for informal workgroup meetings", Conference on Human Factors in Computing Systems: Proceedings of the Interact '93 and CHI '93 conference on Human factors in computing systems; Apr. 24-29, 1993:391-398. (Year 1993).

Kollmann, Franz, "Realizing Fine-Granular Read and Write Rights on Tree Structured Documents." in The Second International Conference on Availability, Reliability and Security (ARES'07), pp. 517-523. IEEE, 2007. (Year: 2007).

Baarslag, "Negotiation as an Interaction Mechanism for Deciding App Permissions." In Proceedings of the 2016 CHI Conference Extended Abstracts on Human Factors in Computing Systems, pp. 2012-2019. 2016 (Year: 2016).

Peltier, "Clustered and Stacked col. and Bar Charts", Aug. 2011, Peltier Technical Services, Inc., pp. 1-128; (Year: 2011).

Beate List, "An Evaluation of Conceptual Business Process Modelling Languages", 2006, SAC'06, Apr. 23-27, pp. 1532-1539 (Year: 2006).

"Demonstracion en espanol de Monday.com", published Feb. 20, 2019. https://www.youtube.com/watch?v=z0qydTgof1A (Year: 2019).

Desmedt, Yvo, and Arash Shaghaghi, "Function-Based Access Control (FBAC) From Access Control Matrix to Access Control Tensor." In Proceedings of the 8th ACM CCS International Workshop on Managing Insider Security Threats, pp. 89-92. (2016).

Anupam, V., et al., "Personalizing the Web Using Site Descriptions", Proceedings of the Tenth International Workshop on Database and Expert Systems Applications, ISBN: 0-7695-0281-4, DOI: 10.1109/DEXA.1999.795275, Jan. 1, 1999, pp. 732-738. (Year: 1999).

Gutwin, C. et al., "Supporting Informal Collaboration in Shared-Workspace Groupware", J. Univers. Comput. Sci., 14(9), 1411-1434 (2008).

Barai, S., et al., "Image Annotation System Using Visual and Textual Features", In: Proceedings of the 16th International Conference on Distributed Multi-media Systems, pp. 289-296 (2010).

B. Ionescu, C. Gadea, B. Solomon, M. Trifan, D. Ionescu and V. Stoicu-Tivadar, "Achat-centric collaborative environment for web-based real-time collaboration," 2015 IEEE 10th Jubilee International Symposium on Applied Computational Intelligence and Informatics, Timisoara, Romania, 2015, pp. 105-110 (Year: 2015).

Susanne Hupfer, Li-Te Cheng, Steven Ross, and John Patterson. 2004. Introducing collaboration into an application development environment. In Proceedings of the 2004 ACM conference on

(56) References Cited

OTHER PUBLICATIONS

Computer supported cooperative work (CSCW '04). Association for Computing Machinery, New York, NY, USA, 21-24 (Year: 2004).

Abor Jr, C., "Low-Code and No-Code AI: New AI Development—What is code anymore?!?!" (as retrieved from https://www.linkedin.com/pulse/ low-code-no-code-ai-new-development-what-code-anymore-c-l-abor-jr); Jul. 15, 2023 (Year: 2023).

Aylward, Grant, "Drag-and-Drop AI Enables Digital Workforce Deployment at Scale Share" (as retrieved from https://www.blueprism.com/resources/ blog/drag-and-drop-ai-enables-digital-workforce-deployment-at-scale/); Mar. 19, 202 (Year: 2020).

Chen et al., "Artificial Intelligence in Education: A Review," IEEEAccess vol. 8, pp. 75264-75278 (Year: 2020).

Dapulse.com, "High Level Overview", Extracted from https://web.archive.org/web/20161104170936/https://dapulse.com (Year: 2016).

Donath, "Interfaces Make Meaning" chapter from The Social Machine: Designs for Living Online, pp. 41-76, copyright 2014. (Year: 2014).

Dorn et al., "Efficient Full-Field Vibration Measurements and Operational Modal Analysis Using Neuromorphic Event-Based Imaging," Journal of Engineering Mechanics, vol. 144, No. 7, Jul. 1, 2018 (Year: 2018).

Freund, K., "SiMa.ai Creates Drag-And-Drop Platform For Building AI Workflows" (as retrieved from https://www.forbes.com/sites/karlfreund/2023/09/12/simaal-creates-drag-and-drop-platform-for-building-ai-workflows/?sh=789de8466046); Sep. 12, 2023 (Year: 2023).

Monday.com et al., "Basic Walkthrough", https://www.youtube.com/watch?v=VpbgWyPf74g; Aug. 9, 2019. (Year: 2019).

Sreenath et al., "Agent-based service selection," Journal of Web Semantics 1.3, pp. 261-279 (Year: 2004).

Stancu et al., "SecCollab-Improving Confidentiality for Existing Cloud-Based Collaborative Editors." In 2017 21st International Conferences on Control Systems and Computer Scient (CSCS), pp. 324-331. IEEE,2017. (Year: 2017).

"Using Filters in Overview," published Mar. 7, 2017. https://www.youtube.com/watch?v=hycANhz7gww (Year: 2017).

Wilson et al., "Beyond Social Graphs: User Interactions in Online Social Networks and their Implications," ACM Transactions on the Web, vol. 6, No. 4, Article 17, Nov. 2012 (Year: 2012).

Zhang et al., "Integrating semantic NLP and logic reasoning into a unified system for fully-automated code checking," Automation in Construction, vol. 73, 2017, pp. 45-57, ISSN 0926-5805, https://doi.org/10.1016/j.autcon.2016.08.027.

Zhenjiang et al., "Asynchronous Event-Based Visual Shape Tracking for Stable Haptic Feedback in Microrobotics," IEEE Transactions on Robotics, IEEE Service Center, Piscataway, NJ, vol. 28, No. 5, Oct. 1, 2012, pp. 1081-1089 (Year: 2012).

Ziheng, G., "Advanced Cyberinfrastructure for Managing Hybrid Geoscientific AI Workflows" (Year: 2019).

\* cited by examiner

DIGITAL PROCESSING SYSTEMS AND METHODS FOR DISPLAY NAVIGATION MINI MAPS

CROSS-REFERENCE TO RELATED APPLICATIONS

This application is based on and claims benefit of priority of U.S. Provisional Patent Application No. 63/273,453 filed on Oct. 29, 2021, the contents of all of which are incorporated herein by reference in their entireties.

TECHNICAL FIELD

The present disclosure relates generally to information display method and display navigation. More specifically, this disclosure relates to systems and methods for performing display navigation operations. Consistent with the disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

Operation of modern enterprises can be complicated and time-consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project.

In addition, project management software applications often depend on the use of massive amounts of shared information, taking the form of documents, files, ledgers, spreadsheets, dashboards, or more generally a page. Most of the time, not all the content on a page can fit within the dimensions of a particular display device. This is especially true when a plurality of users is allowed to add information or when using a mobile display device with particularly limited dimensions. It is therefore essential to be able to quickly find one's way through this vast amount of information to ensure efficient operations. In these situations, many display devices rely on graphical user interface components, such as scroll bars, to allow a user to access different portions of the information.

One limitation of existing scrollbars is that they don't reflect the organization of the content of a page. Scrollbars typically include an elongated track representing the overall size of the page and a cursor anchored on or near the track at the relative position of the portion of the page being displayed. When scrolling occurs, by dragging the cursor, for example, there is no way of knowing which section of the page is being displayed and associating a particular position on the scroll bar with a particular group of information.

SUMMARY

Embodiments consistent with the present disclosure provide systems and methods for performing and facilitating navigation operations. The disclosed embodiments may be implemented using a combination of conventional hardware and software as well as specialized hardware and software.

In an embodiment, a non-transitory computer-readable medium containing instructions that, when executed, cause at least one processor to perform display navigation operations is disclosed. The operations may comprise presenting a plurality of groups of information on a display, in the form of a page, each of the plurality of groups of information having an associated size, wherein a cumulative size of all of the groups of information is larger than at least one dimension of the display; receiving an initial scrolling signal for causing the presented page to scroll on the display; and augmenting the display with a scroll bar divided into sections of differing visual effects, wherein each section has a visual effect corresponding to a visual effect assigned to one group of the plurality of groups of information, a length of each section is proportional to the associated size of the one group relative to the cumulative size of all the groups, and an order of the visual effects in the scroll bar corresponds to an order of the groups of information in the page.

In an embodiment, a method for display navigation is disclosed. The method may comprise: presenting a plurality of groups of information on a display, in the form of a page, each of the plurality of groups of information having an associated size, wherein a cumulative size of all of the groups of information is larger than at least one dimension of the display; receiving an initial scrolling signal for causing the presented page to scroll on the display; and augmenting the display with a scroll bar divided into sections of differing visual effects, wherein each section has a visual effect corresponding to a visual effect assigned to one group of the plurality of groups of information, a length of each section is proportional to the associated size of the one group relative to the cumulative size of all the groups, and an order of the visual effects in the scroll bar corresponds to an order of the groups of information in the page.

In an embodiment, a system for performing display navigation operations on a display having dimensions smaller than a page presented on the display is disclosed. The system may comprise a memory storing instructions and at least one processor that executes the stored instructions to: present a plurality of groups of information on a display, in the form of a page, each of the plurality of groups of information having an associated size, wherein a cumulative size of all of the groups of information is larger than at least one dimension of the display; receive an initial scrolling signal for causing the presented page to scroll on the display; and augment the display with a scroll bar divided into sections of differing colors, wherein each section is colored in a color assigned to one group of the plurality of groups of information, a length of each section is proportional to the associated size of the one group relative to the cumulative size of all the groups, and an order of the colors in the scroll bar corresponds to an order of the groups of information in the presented page.

Other advantages of the invention are set forth in the appended claims which form an integral part hereof. The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
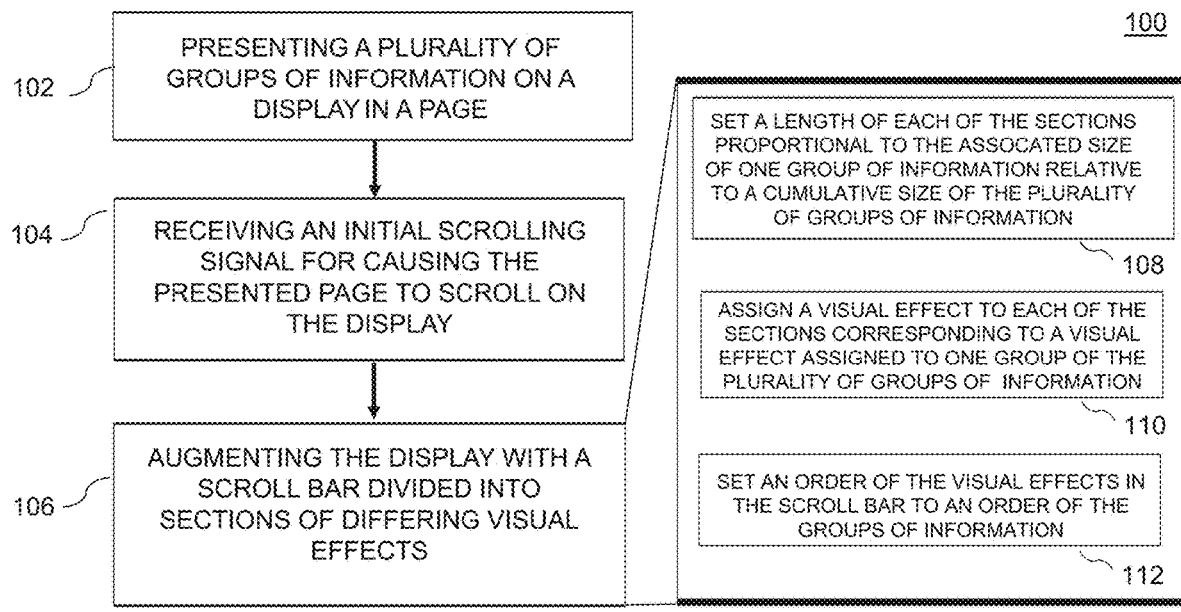
FIG. 1 is a flowchart of an exemplary process for performing navigation operations, consistent with the disclosed embodiments.

Disclosed embodiments provide improved display navigation mechanisms. Disclosed embodiments may generate and display a scroll bar depicting a "mini map" of a displayed page that is larger than the size of the computer display. In response to an interaction with the displayed mini map, a user may be able to quickly scroll through a board or a different section of the mini map.

Disclosed embodiments may be suitable for graphical user interface boards and tablature structure because they may enable users to interact with the scroll bar to quickly jump to different sections of the tablature without needing to scroll all the way through, while also providing an overview of each section of the tablature with groups of information showing relative sizes of indications. Such exemplary embodiments may be helpful in different display devices such as those found on mobile devices, computers, or any other 2D, 3D, AR, VR, or holographic displays. The indications of the groupings of information may be displayed vertically, horizontally, or any other orientation in the scroll bar according to user preference or according to a determined structure of the tablature. The indications of each section may be based on any characteristics of information in the table such as a shared status, person, data type (e.g., group all text column types together, all email columns together, and so on). For example, a scroll of a scroll bar mini map may result in displays of indications that may be relatively sized and colored according to statuses and the number of items sharing a particular status. In response to any interaction, such as a scroll, some disclosed embodiments may include displaying a mini map scroll of all group types found in tablature.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality apply equally to methods and computer readable media and constitutes a written description of systems, methods, and computer readable media. The underlying platform may allow a user to structure a systems, methods, or computer readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and/or a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, tablature may include any type of information, depending on intended use. When used in conjunction with a workflow management application, the tablature may include any information associated with one or more tasks, such as one or more status values, projects, countries, persons, teams, progress statuses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real time in collaborative work systems involving electronic collaborative word processing documents. Electronic collaborative word processing documents (and other variations of the term) as used herein are not limited to only digital files for word processing, but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information, and may be linked to other sources of data for dynamic updates. Blocks may be automatically organized by the system, or may be manually selected by a user according to preference. In one embodiment, a user may select a segment of any information in an electronic word processing document and assign it as a particular block for input, editing, formatting, or any other further configuration.

An electronic collaborative word processing document may be stored in one or more repositories connected to a network accessible by one or more users through their computing devices. In one embodiment, one or more users may simultaneously edit an electronic collaborative word processing document. The one or more users may access the electronic collaborative word processing document through one or more user devices connected to a network. User access to an electronic collaborative word processing document may be managed through permission settings set by an author of the electronic collaborative word processing document. An electronic collaborative word processing document may include graphical user interface elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

As used herein, a non-transitory computer-readable storage medium refers to any type of physical memory on which information or data readable by at least one processor can be stored. Examples of memory include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage Accordingly, the term computer-readable storage medium should be understood to include tangible items and exclude carrier waves and transient signals.

Some embodiments may involve at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Certain embodiments disclosed herein may include a processor configured to perform methods that may include triggering an action in response to an input. The input may be from a user action or from a change of information contained in a user's table or board, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a schematic diagram of an exemplary process (100) for performing navigation operations that may be executed by at least one processor. Process 100 is used for explanatory purposes and is not intended to be limiting. The process may be implemented using one or more components of computing device 1200 (discussed in FIG. 12) or user device 1320 of computing architecture 1300 (discussed in FIG. 13). As shown in FIG. 1, process 100 may include a step 102 of presenting a plurality of groups of information on a display in the form of a page. In some embodiments, the page may be a complete full-screen image, or a representation of a screenful of information. The page may include text and elements that are provided on a display, subject to the dimensions of the display such as the display width and/or height. In some embodiments, the page may be a screen of a computer application executed by at least on processor of a computing device such as computing device 1200. In some embodiments, the page may be a webpage or website provided for presentation on a display of the computing device 1200.

Above and throughout this disclosure, a "group of information" may refer to any type of data associated with a visual representation, such as text, images, numbers, lists, tables, diagrams, charts, graphics, drawings, or other types of graphical user interface components. Each group of information may have an associated size, such as a size that a group of information may have when presented on a display. In some embodiments, a "size" may be associated with a dimension of length, such as standard or metric units of length, or a number of pixels shown of the display. Multiple groups of information, considered together, may have a cumulative size corresponding to the total size of all the groups of information. A cumulative size of the plurality of groups of information may be larger than at least one dimension of the display.

As used in this disclosure, the term "display" may refer either to any physical device capable of providing a visual presentation of data or directly to a visual presentation of data. Examples of physical devices acting as displays include computer screens, smartphone screens, tablet screens, smartwatch screens, laptop screens, video walls, projectors, head-mounted displays or virtual reality headsets. Additionally, displays may utilize graphical user interfaces (GUIs) to permit user interaction with data. In many GUIs, a visual presentation of data is often provided using a graphical user interface component known as a window, or a page. Any visual presentation of a device or display may be characterized by dimensions, these dimensions are usually limited, so most of the time, any type of information cannot be completely presented by a display device or fit a presented page. For example, when a plurality of groups of information is arranged side by side, a cumulative size of the plurality of groups of information may be larger than at least one dimension of the display.

In step 104, the processor may receive an initial scrolling signal for causing the presented page to scroll on the display. In some embodiments, the initial scrolling signal may be received as a result of manipulating various controls associated with the scroll bar, or a particular movement made by the user that is interpreted by the processor as a command to scroll. In some embodiments, a scroll signal can be the result of moving a cursor docked on or near a scroll bar presented on the display, clicking on increment/decrement control interface buttons, detecting a touch motion or gesture associated with manipulating or attempting to move the presented page, or performing a swipe motion relative to the display. In the context of this description, an initial scrolling signal refers to a scrolling signal that may occur in advance of scrolling the page, and in advance of a later scrolling signal. In some embodiments, an initial scrolling signal may scroll the presented page over a distance less than, greater than, or equal to one of the dimensions of the display.

In some embodiments, the presented page may represent less than an entire page. In some embodiments, the entire page may include all the groups from the plurality of groups of information. Accordingly, the entire page may include one or more groups of information that are not displayed on the presented page. In some embodiments, the presented page may include at least a portion of all of the groups of information, but may not include a portion of a large group that extends beyond the presented page. In such embodiments, the entire page may include all of the groups of information in their entirety. Thus, the entire page may include the presented page and, in addition, one or more groups of information or portions of groups of information that are not fully displayed on the presented page. For example, the entire page may extend beyond the dimensions of the display, such that the scroll bar facilitates navigation to different parts of the presented page and also to portions of the entire page that are not yet presented. Such portions of the entire page may be presented during a scrolling action toward the portions. In some embodiments, an interaction with a particular location on the scroll bar may scroll the page to a corresponding particular location in the entire page. An interaction may refer to any type of user input related to a scrollbar component. For example, if a user is clicking on a particular location of the scroll bar, the page may be scrolled up to the corresponding particular location. Other examples of interactions with a particular location on the scroll bar may include persistently clicking on the particular location, touching the scroll bar at a particular location presented on a touchscreen, persistently touching the scroll bar at a particular location, performing a gesture such as double tapping a particular location on the scroll bar, or repeatedly tapping a particular location on the scroll bar.

In step 106, in response to receiving the initial scrolling signal, the display may be augmented with a scroll bar divided into sections of differing visual effects. The visual effects may serve to distinguish and differentiate between each group of information among the plurality of group information, thereby facilitating user navigation operations and increasing the efficiency and accuracy of navigation operations. In some embodiments, each portion of the scroll bar may be directly associated with each group of information using different visual effects.

As discussed herein, visual effects may refer to any type of enhancement or characteristic of a visual representation that distinguishes one group of information, or one section of the scroll bar, from another. In one embodiment, the differing visual effects may include a unique color associated with each group of the plurality of groups of information. For example, each of a first group of information can be associated with a section having a first color, a second group with a second color, and so on, such that the displayed colors all differ from each other. Different colors may differ by shade, hue, tone, brightness, coloration, or other characteristics that cause one color to differ visually from another. In some embodiments, the differing visual effects may include a unique combination of a color and a texture associated with each group of the plurality of groups of information. A texture may include a pattern or other visual appearance that may be combined with a color to further differentiate appearances of different sections in a scroll bar. Non-limiting examples of textures can include stippling patterns of various densities, or cross-hatching patterns. In such embodiments, a first group of information can be associated with a first combination of color and texture, a second group with the second combination of color and texture, and so on, so that the displayed combinations are all different from each other, even if multiple sections have the same or similar colors. In this situation, two or more groups of information can be associated with the same color but with a different texture, and conversely, two or more groups of information can be associated with the same texture but with different colors. Accordingly, each section of the scroll bar may have a visual effect corresponding to a visual effect assigned to one group of the plurality of groups of information, shown in FIG. 1 in substep 110. In some embodiments, the visual effects may include a combination of two or more colors, gradients, patterns, shadows or any combination thereof.

In some embodiments, a "scroll bar" may be a graphical user interface component or element that provides a visual representation of the groups of information in the entire page. In some embodiments, a scroll bar is an interactive horizontal or vertical bar at the side or bottom of the display, for moving around a page on the display. The scroll bar may include part or all of a mini map of all of the groups of information, using different visual effects to readily distinguish between each group of information. Graphical user interface components such as the scroll bar may include interactive capabilities, and permit a user to access a particular portion of the page via selection of a section in the scroll bar associated with a group of information corresponding to the particular portion of the page. The scroll bar may therefore permit a user to scroll and navigate in the page in an indicated direction based on characteristics of the received a scrolling signal.

In some embodiments, sections of the scroll bar may have attributes determined based on the groups of information in the entire page. For example, in a displayed scroll bar, a length of each section may be set proportional to an associated size of the one group relative to the cumulative size of all the groups, as shown in substep 108 of FIG. 1. Accordingly, each section may be displayed in a manner that conveys relative sizes of each of the plurality of groups of information. Some embodiments may include determining a total length or size of a page in a given dimension, and determining a ratio, portion, percentage, or fraction of the size occupied by each one of the groups of information, in order to generate a displayed scroll bar with such proportional section lengths.

In some embodiments, an order of the visual effects in the scroll bar may be set to correspond to an order of the groups of information in the page, as shown in substep 112. As a result, a user may scroll between groups of information simply by moving up or down along the scroll bar, and may quickly and efficiently navigate between groups of information in the page. In some embodiments, all of the sections may be presented on the display while the scroll bar is presented. In other embodiments, fewer than all of the sections may be presented on the display. The displayed sections may change depending on various factors such as a size of the page, a current position in the page, and one or more size constraints or capabilities of the display.

In some embodiments, the scroll bar may be configured to disappear from the display after a predetermined time, and after the initial scrolling signal is completed. For example, once the initial scrolling signal is received and over, the scroll bar may disappear from the display after 1, 2, or 5 seconds or any suitable time.

FIGS. 2A-2D illustrate examples of a plurality of groups of information presented on a display, showing a representation of a scroll bar divided into sections of differing visual effects consistent with the disclosed embodiments. A display 208 of a computing device is shown as a broken-line box to illustrate the dimensions and bounds of the display. As shown, a scroll bar 210 is located on the right side of the display, with sections (212a-d, 214a-d, 216a-d) of differing visual effects. A plurality of groups of information (202a-d, 204a-d, 206a-d) are included in a page presented on the display.

As shown in FIGS. 2A-2D, the dimensions of display 208 do not permit the display of the entire page 218 having groups of information (202a-d, 204a-d, 206a-d). As shown, a cumulative size of the plurality of groups of information (Group 1, Group 2, and Group 3) is greater than one of the dimensions of the display (e.g., the vertical dimension), and thus not all the groups of information are displayed simultaneously. In the examples in FIGS. 2A-2D, the first group of information (202a-d) is fully displayed, the second group of information (204a-d) is partially displayed and cropped, and the third group of information is not presented on the display due to display size limitations.

Figure 2A:
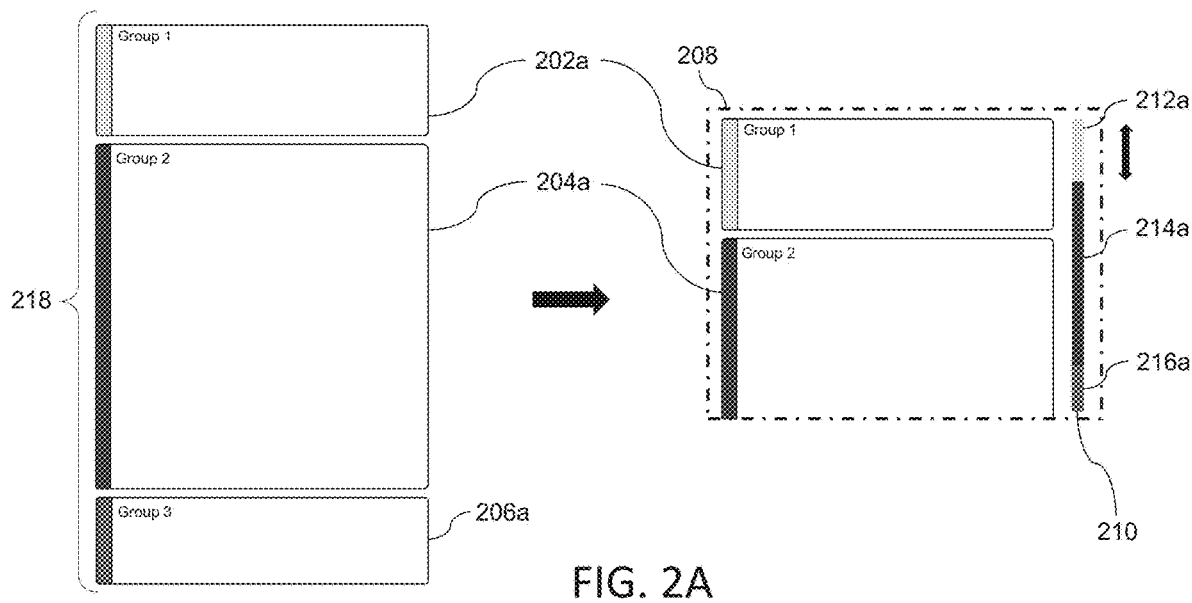
FIG. 2A is an illustration of an exemplary graphical user interface with a scroll bar divided into sections of differing visual effects, consistent with disclosed embodiments.

In the examples shown, scroll bar 210 is divided into a plurality of sections (212a-d, 214a-d, 216a-d), and each section has a visual effect corresponding to the visual effect assigned to the group of the plurality of groups of information. The sections of scroll bar 210 are shown with lengths that are proportional to the associated sizes of each of the groups of information. For example, as shown in FIGS. 2A, section 212b corresponds to "Group 1" and group of information 202b, and section 214b corresponds to "Group 2" and group of information 204b. Group 2 has a larger size relative to Group 1 in the page, and therefore section 214b has a proportionally larger size relative to section 212b.

FIGS. 2A-2D also show a scroll bar 210 having sections in an order of the visual effects in the corresponding groups of information in the page. For example, as shown in FIG. 2A, sections 212a and 214a correspond to Group 1 and Group 2, respectively. Visual effects assigned to Group 1 and Group 2 are shown in scroll bar 210 in an order that those groups of information appear in the page. In some embodiments, visual effects appearing in scroll bar 210 may not appear in the respective groups of information. In such embodiments, visual effects may be assigned to different groups of information to distinguish groups in the scroll bar, even if the same visual effects do not appear elsewhere in the page.

Although FIGS. 2A-2D illustrate three different groups of information, with different associated sizes, it is to be appreciated that any number of groups of information may be used. The benefits of the disclosed embodiments are realized when the number of groups of information is greater than one. In addition, two different groups of information may have the same associated size, or may have different sizes. It is also to be appreciated that whilst FIGS. 2A-2D depict a plurality of groups of information whose cumulative size is greater than the vertical dimension of the display, the cumulative size may be greater than either or both of the horizontal and vertical dimensions of the display. In some embodiments, the cumulative size may be greater than both dimensions of the display. In such embodiments, a standard scroll bar may be provided to perform navigation operations along a direction other than the direction of scroll bar 210 with sections of different visual effects. For example, if the presented page includes a plurality of groups that are larger in height and width than the display, scroll bar 210 may be displayed along a vertical axis, and a standard scroll bar may be displayed along a horizontal axis. In some embodiments, scroll bar 210 having multiple sections and visual effects may be displayed along a horizontal axis. Further, while FIGS. 2A-2D illustrates the scroll bar 210 located on the right-hand side of the display, scroll bar 210 may be located in any suitable portion of the display. The potential configurations are not limited by the examples in this disclosure.

As discussed above, a length of each section may be proportional to an associated size of the one group relative to the cumulative size of all the groups. Furthermore, a one of the two dimensions (vertical or horizontal) of the scroll bar 210 may be proportional to the overall size of the page corresponding to the cumulative size of all the groups of information. In the context of this description, this dimension will be referred to as the "primary dimension" and the other dimension as the "secondary dimension." In some embodiments, the primary dimension may be comparable to one of the dimensions of the display. For example, in FIGS. 2A-2D, the vertical dimension of scroll bar 210 may be correspond to the vertical dimension of display 208. The secondary dimension may not be proportional to characteristics of the plurality of groups of information. In some embodiments, the secondary dimension may be selected to meet readability, visual comfort, or aesthetic criteria. In some other embodiments, the secondary dimension may be a result of a user input.

Although FIGS. 2A-2D represent examples of a new scroll bar design having sections with different visual effects, it should be appreciated that any other design implementation that covers the functions of a scroll bar and provides a visual representation with parts divided into sections of different visual effects can be used. For example, scroll bar 210 may be appear similar to standard scroll bars, having a scroll bar "shaft" or "track," in which a scroll "thumb" or scroll "box" moves. The scroll bar track may be divided into sections of different visual effects, such that the track has an outline, background, or any other visual feature that shows different visual effects consistent with the disclosed embodiments. In some embodiments, the scroll box may have a fixed appearance, or may include one or more varying visual effects consistent with disclosed embodiments. In some embodiments, scroll bar 210 may include one or more navigation buttons at one or more ends of the scroll bar.

Figure 2B:
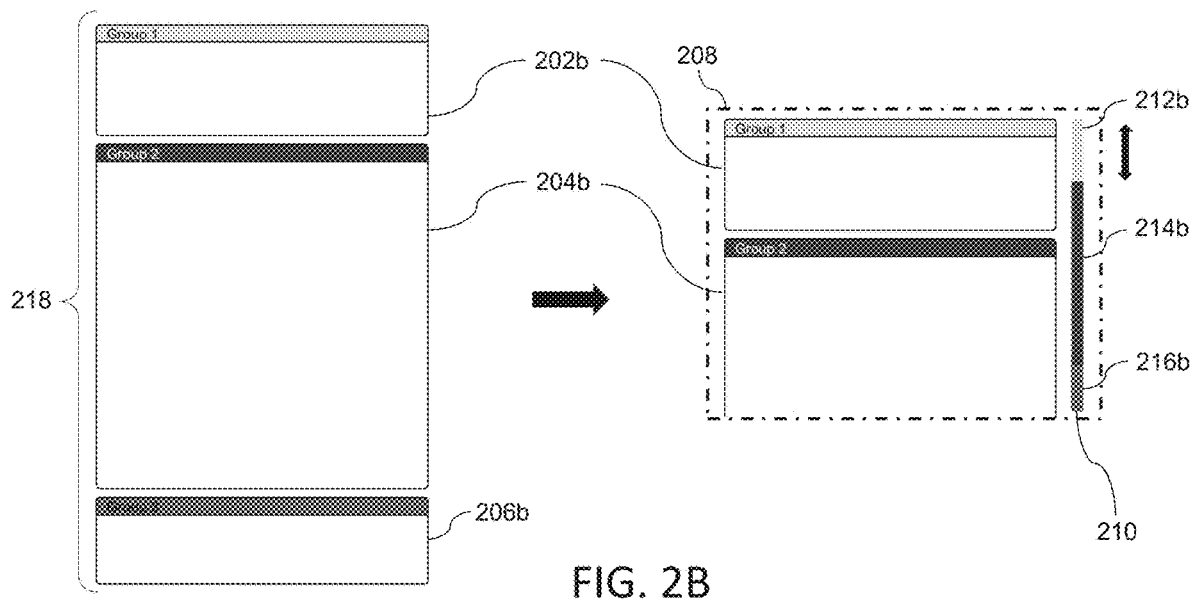
FIG. 2B is another an illustration of an exemplary graphical user interface with a scroll bar divided into sections of differing visual effects, consistent with disclosed embodiments.
Figure 2C:
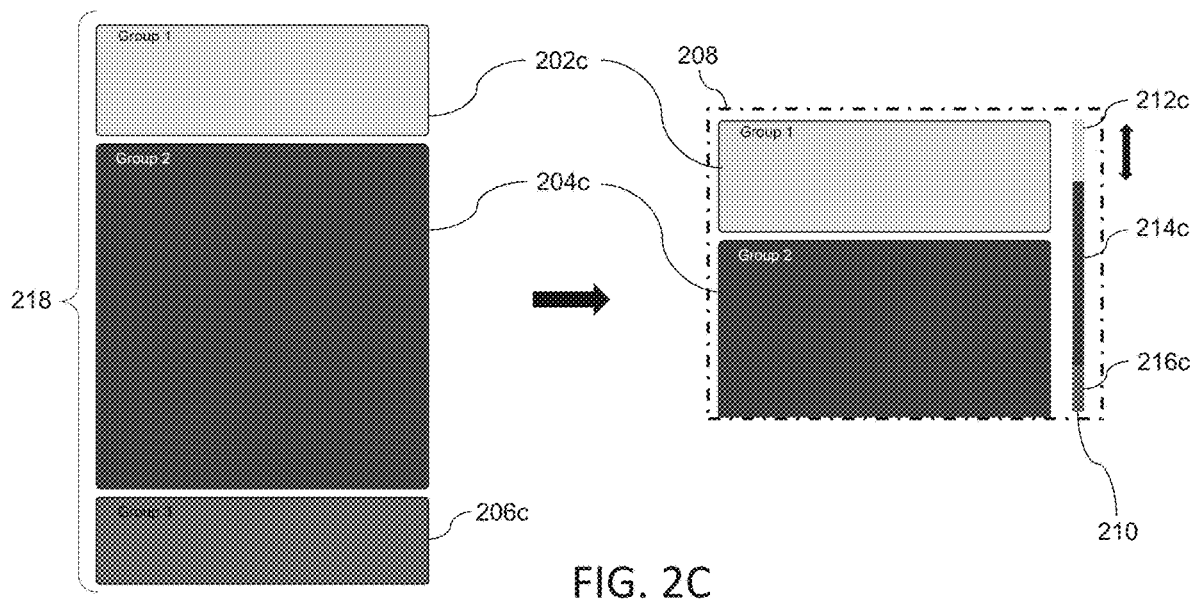
FIG. 2C is another illustration of an exemplary graphical user interface with a scroll bar divided into sections of differing visual effects, consistent with disclosed embodiments.
Figure 2D:
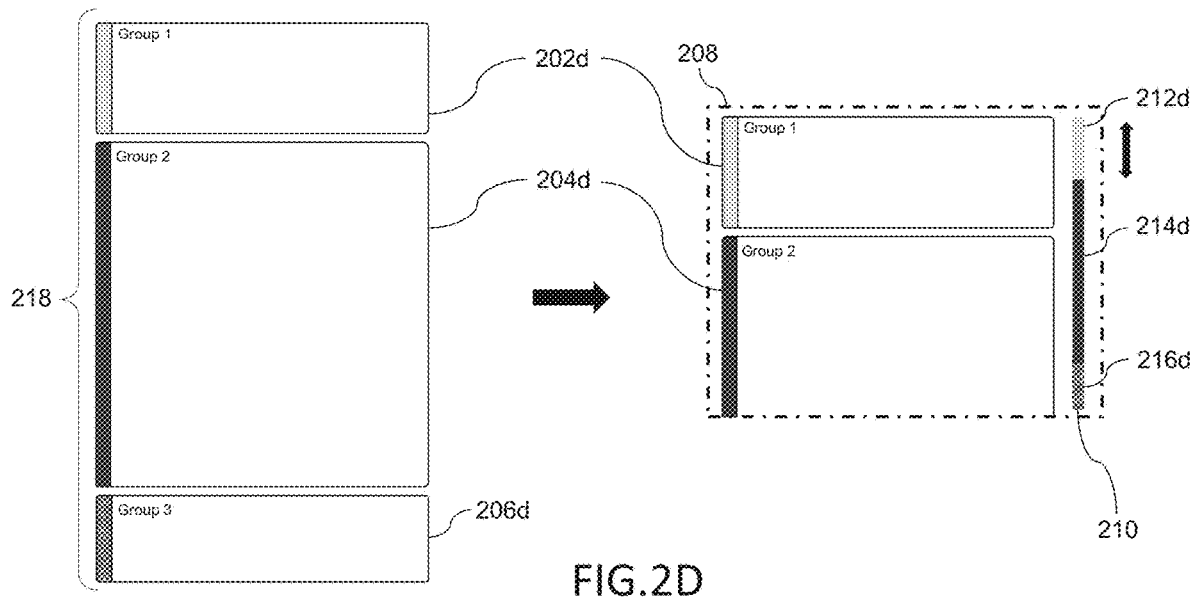
FIG. 2D is another illustration of an exemplary graphical user interface with a scroll bar divided into sections of differing visual effects, consistent with disclosed embodiments.

Disclosed embodiments may provide different ways of identifying a visual effect assigned to a group of information. In some embodiments, a visual effect may be displayed in conjunction with a group of information such that when scrolling through the section corresponding to the group of information, the visual effect assigned to the group of information is always visible. For example, as shown in FIG. 2A a visual effects-coded border may be displayed next to the group of information, such that the differing visual effects may include a unique color associated with each group of the plurality of groups of information. As another example, as shown in FIG. 2D the differing visual effects may correspond to a unique combination of a color and a texture associated with each group of the plurality of groups of information. In some embodiments, as shown in FIG. 2B, a visual effect-coded heading may be displayed at the top of the display or above an associated corresponding group of information. The heading may be displayed until the corresponding group of information is no longer presented due to a scroll signal associated with navigating to one or more other different groups of information that occupy the presented page. In some embodiments, such as the example illustrated in FIG. 2C, a visual effect-coded background may be presented behind a corresponding group of information, such that the visual effects correspond to a unique color associated with each group of the plurality of groups of information. The examples shown in FIGS. 2A-2D are non-limiting and other visual designs that include a visual effect displayed in conjunction with a group of information may be employed without departing from the scope of the disclosed embodiments.

In some embodiments, the differing visual effects may include a unique combination of a color and a texture associated with each group of the plurality of groups of information. In some embodiments, in response to a determination that a same color is assigned to more than one of the plurality of groups of information, a different texture may be assigned to each group of the plurality of groups of information having the same color. In some embodiments, textures may be assigned only one or more of the groups of information that are assigned the same color. In some embodiments, textures may be assigned to all groups of information associated with the same color. Such a situation may arise, for example, if a user manually assigns the same color to multiple groups, or as another example, if the number of groups of information exceeds a number of available, distinguishable colors.

Figure 3:
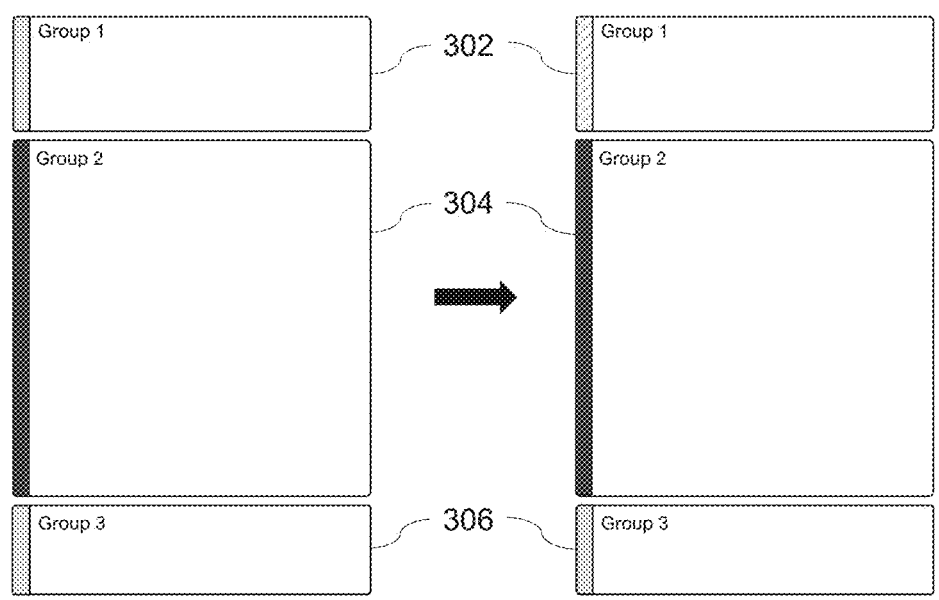
FIG. 3 is an illustration of an exemplary graphical user interface with multiple groups of information that are initially assigned a same color, consistent with disclosed embodiments.

FIG. 3 is an exemplary illustration of a plurality of groups of information, in which two groups of information are initially assigned with a same color, consistent with disclosed embodiments. As shown in FIG. 3, a first group of information 302, second group of information 304, and third group of information 306 are included in a page. First group of information 302 and third group of information 306 may be assigned the same color. The device processor may determine that more than one group of information is assigned a same color, and responsive to this determination a different texture may be assigned to each group of information that is assigned to the same color. In some embodiments, this determination may be made prior to an initial scrolling signal, or upon receipt of the initial scrolling signal. Although FIG. 3 illustrates a situation in which two groups of information have been assigned with the same color, the process of assigning a different texture to each group of information may be generalized to any number of groups of information that have been assigned with a same color. Additionally or alternatively, in some embodiments, in response to a determination that a same color is assigned to more than one of the plurality of groups of information, one or more of the colors assigned to each group of the plurality of groups of information may be changed, so that all assigned colors are different from each other.

Disclosed embodiments may provide different ways of assigning a visual effect to a group of information. In some embodiments, a visual effect may be assigned to a group of information in response to a user input. For example, at any time during a process of creating or editing a group of information, the processor may receive inputs from a user associated with choose a visual effect and assign it to the group of information. In some embodiments, the processor may receive an input from a user associated with modifying a visual effect assigned to the group of information at any time during a process of editing a group of information. In some embodiments, one or more processors may automatically assign a visual effect to a group of information based on information included in the group of information, such as based on a type of the information. For example, a first visual effect may be assigned to a first group of information corresponding to images, and a different second visual effect may be assigned to a second group of information corresponding to text. In some embodiments, a visual effect may be automatically assigned to a group of information when the group of information is created. Further, in some embodiments, each of the plurality of groups of information may have a predetermined visual effect. In some embodiments, all groups of information may be assigned predetermined visual effects, regardless of how the visual effect is assigned to the group of information. The assignment may occur, in some embodiments, prior to receiving the initial scroll signal.

Figure 4:
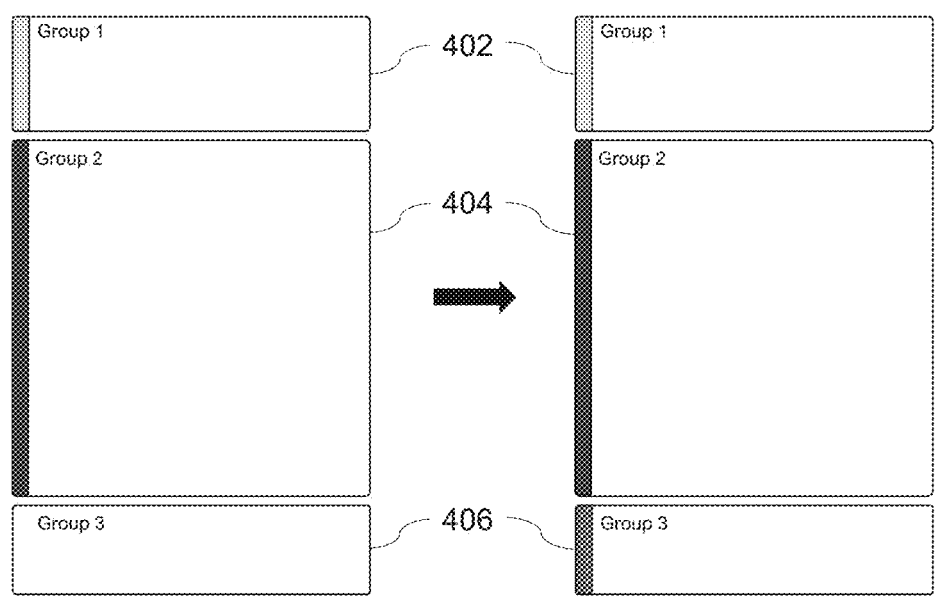
FIG. 4 is an illustration of an exemplary graphical user interface with a group of information that is not initially assigned a visual effect, consistent with disclosed embodiments.

In some embodiments, at least one processor may be configured to assign a random visual effect to at least one of the plurality of groups of information, in response to a determination that one of the plurality of groups of information was not assigned with a visual effect. In some embodiments, such a determination may be made prior to the scroll, or prior to receiving the initial scrolling signal. A "random" assignment may be made in a pseudorandom manner by employing a computerized randomizer or a random number generator that selects a visual effect in a manner where there is no visual effect more likely to be selected over other visual effects at a given time. FIG. 4 is an illustration of a plurality of groups of information having one group of information that is not initially assigned a visual effect, in accordance with the disclosed embodiments. As shown in FIG. 4, there are first, second, and third groups of information 402, 404, and 406, and third group of information 406 is not assigned a visual effect. At least one processor may determine, prior to an initial scrolling signal, upon receipt of the initial scrolling signal, or prior to the scroll, that third group 406 is not assigned a visual effect. Responsive to this determination, the at least one processor may assign a random visual effect to third group 406. In the example shown, a combination of color and texture is assigned to third group 406. In some embodiments, such an assignment may result in a visual effect being applied to a section of a scroll bar. Although FIG. 4 illustrates a situation in which only one group of information has not been assigned a visual effect, the process of assigning a random visual effect to one group of information may be generalized to any number of groups of information that have not been assigned a visual effect.

In some embodiments, assigning a random visual effect to one of the plurality of groups of information may include assigning a random visual effect that is different from all visual effects already assigned to the other groups of information of the plurality of groups of information. For example, if the visual effects correspond to a unique color associated with each group of the plurality of groups of information, a random color may be selected from all available colors on the display, minus the colors already assigned to the other groups of information. Additionally or alternatively, in some embodiments, assigning a random visual effect to one of the plurality of groups of information may include assigning a random visual effect that contrasts from other visual effects by at least a threshold amount difference in a visual characteristic from other visual effects assigned to the other groups of information. Such characteristics may include, for example, a threshold difference in hue, brightness, coloration, tint, tone, darkness, contrast, brightness, or any other measurable characteristic associated with visual impression and identity. For instance, in the example shown in FIG. 4, a color that is chromatically opposite to the color of group 404, may be selected for group 406 to increase the contrast between two consecutive groups of information. In some embodiments, wherein the visual effects may correspond to a unique color associated with each group of the plurality of groups of information, assigning a random visual effect to one of the plurality of groups of information may include assigning a color belonging to a predetermined group of colors, or a color palette, different from the colors already assigned to the other groups of information. In some embodiments, a user may provide, and at least one processor may receive, input associated with assigning unique colors from a color palette to one or more groups of information for practical or aesthetic reasons. If the at least one processor determines that no color has been assigned to certain other groups of information, a color from the remaining colors in the palette may be randomly selected and assigned to those other groups of information.

Figure 5:
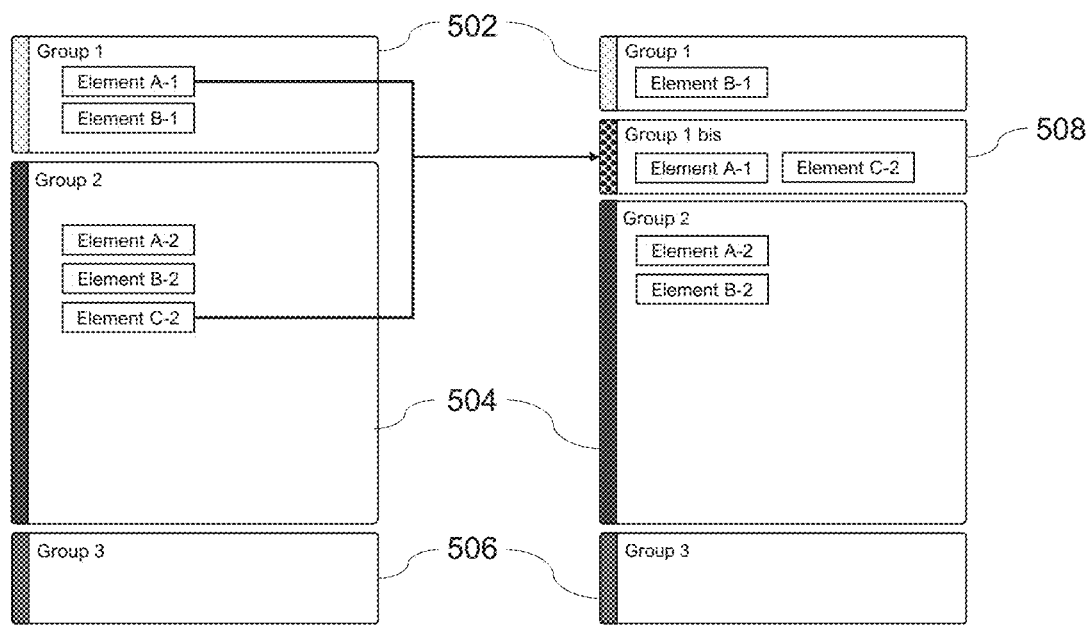
FIG. 5 is an illustration of an exemplary graphical user interface with elements from two different groups of information combined to form a new group of information, consistent with disclosed embodiments.

In some embodiments, in response to a determination that elements from different groups of information are combined to form a new group of information, at least one processor may assign to the new group of information a visual effect that corresponds to a combination of visual effects of the different groups of information from which the elements originate. As discussed herein, a new group of information may refer to a group of information that did not exist prior to an original assignment of visual effects, or existed as multiple separate groups. The new group of information may be considered part of the plurality of group of information, and an associated size of the new group of information may contribute to the cumulative size of all groups of information. In some embodiments, the cumulative size may remain constant, if the combined group does not differ in dimension from the sum of the groups of information that were combined. FIG. 5 is an illustration of an exemplary plurality of groups of information, including, first group 502, second group 504, and third group 506. As shown, elements from two different groups of information (first group 502 and second group 504) are combined to form a new group of information, in accordance with disclosed embodiments. As shown in FIG. 5, a new group "1-bis" 508 is created from elements originally belonging to the first group 502 and second group 504. A processor may assign a visual effect to the new group of information 508 based on a combination of the visual effects assigned to the first 502 and second 504 group of information, such as by combining one or more of the color(s) and texture(s) from first group 502 and from second group 504. In some embodiments, in response to the determination that a new group is created, a new section corresponding to the new group may be added to the scroll bar (not shown in FIG. 5) at a position corresponding to the position of the new group and with a dimension (such as length) that is proportional to the associated size of the new group relative to the other groups of information.

In some embodiments, at least one processor may receive a continued scrolling signal following the initial scrolling signal, and in response to the continued scrolling signal, may cause the page to scroll on the display while maintaining a static position of the scroll bar on the display. In the context of this description, a continuous scrolling signal may refer to a scrolling signal received after an initial scrolling signal is completed. In some embodiments, the continuous scrolling signal may comprise a version of the initial scrolling signal that persists beyond a predetermined threshold period of time. In some embodiments, the continuous scrolling signal may cause a page currently presented on the display to scroll based on a direction of the received signal, so that the page presented on the display during the scroll differs from the page initially presented prior to the scroll. In some embodiments, a continuous scrolling signal may scroll the presented page over a distance less than, greater than, or equal to one of the dimensions of the display. Note that during the course of operations of disclosed processes, one or more continuous scrolling signals may be received, therefore a continuous scrolling signal may correspond to a scrolling signal received after a previous continuous scrolling signal is completed.

In some embodiments, the scroll bar may maintain a fixed and constant position on the display during a scroll, to maintain a static position. That is, a location of the scroll bar may remain unchanged and invariable. In some embodiments, the scroll bar may disappear from the display. The at least one processor may terminate display of the scroll bar in various scenarios, such as after a predetermined time after an initial scrolling signal is completed or no longer received, or after a predetermined time following the last receipt of a continuous scroll signal. In some embodiments, this predetermined time may be as small as zero seconds, such that the scroll bar disappears immediately after completion of the initial and/or continuous scrolling signals. In some embodiments, the scroll bar may remain on the display if a continuous scrolling signal is received after the initial scrolling signal is completed and before a predetermined time period elapses. For example, once the initial scrolling signal is received and completed, the scroll bar may remain on the display if a continuous scrolling signal is received before elapse of a time period of 1, 2, 5 seconds or any suitable time. In some other embodiments, the scroll bar may be configured to disappear from the display after a predetermined time just after a continuous scrolling signal is completed. For example, once the continuous scrolling signal is received and over, the scroll bar may disappear from the display after 1, 2, 5 seconds or any suitable time period. Additionally, in some embodiments, wherein a time between an end of one continuous scrolling signal and the receipt of another continuous scrolling signal is less than a predetermined time, the scroll bar may be configured to remain on the display. For example, if the delay between the completion of a first continuous scrolling signal and the reception of a second continuous scrolling signal is less than 1, 2, 5 seconds or any suitable time, the scroll bar may be configured to remain on the display.

In some embodiments, in response to the detection of the initial scrolling signal or the continuous scrolling signal, at least one processor may augment the display with a variable visual effect cursor located near the scroll bar. Furthermore, during scrolling within a particular group of information, the at least one processor may display a visual effect of the variable visual effect cursor that corresponds to the visual effect on the scroll bar associated with the particular group of information. A cursor may refer to an on-display indicator, icon, or other graphical element used to mark a position on a display. Additionally, a cursor may correspond to and indicate a position on a display that will be affected by a user input. Thus, the indicated position may be a place at which a user last interacted with the display, or a place on the display where at least one processor would effect a change in response to a received input.

Figure 6A:
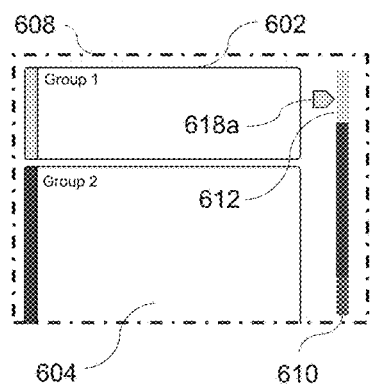
FIG. 6A is an exemplary illustration of a plurality of groups of information presented on a display, showing a representation of a scroll bar divided into sections of differing visual effects, and a variable visual effect cursor, consistent with the disclosed embodiments.
Figure 6B:
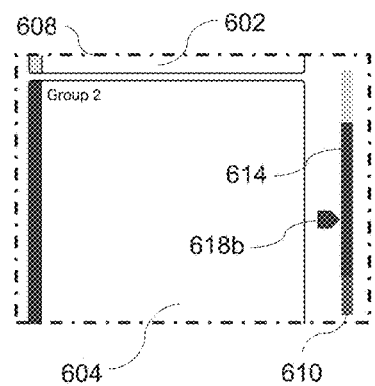
FIG. 6B is an illustration of an exemplary graphical user interface with a scroll bar divided into sections of differing visual effects and a variable visual effect cursor, consistent with disclosed embodiments.
Figure 6C:
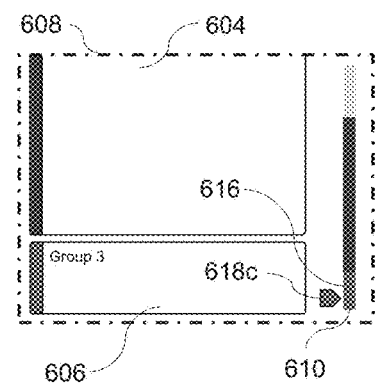
FIG. 6C is another illustration of an exemplary graphical user interface with a scroll bar divided into sections of differing visual effects and a variable visual effect cursor, consistent with disclosed embodiments.

FIGS. 6A-6C illustrate examples of a plurality of groups of information presented on a display 608, consistent with disclosed embodiments. As shown, a scroll bar 610 is divided into sections of differing visual effects, and a variable visual effect cursor (618a, 618b, 618c), consistent with the disclosed embodiments. In these figures, the entire page constituted by the plurality of groups of information (602, 604, 606) remains the same. The groups of information in the presented page on the display change in a manner corresponding to changes in the appearance and position of the variable visual effect cursor (618a, 618b, 618c) along the scroll bar 610.

In FIG. 6A, the presented page includes the first group of information 602, and accordingly, the variable visual effect cursor 618a is located along the scroll bar 610 adjacent first section 612 of scroll bar 610. An appearance of visual effect cursor 618a has a visual effect that is assigned to the first group 602. In some embodiments, the first group of information 602 may or may not include the assigned visual effect on the display.

In FIGS. 6B and 6C, a scroll may cause the presented page to transition to the second group of information 604 (FIG. 6B) and then to the third group 606 of information (FIG. 6C). As shown, the variable visual effect cursor (618b,

618*c*) may transition along the scroll bar 610 accordingly. In FIG. 6B, variable visual effect cursor 618*b* is positioned adjacent a respective location of the second section 614 of scroll bar 610. In FIG. 6C, variable visual effect cursor 618*c* is positioned adjacent a respective location of third section 616. As shown, variable visual effect cursor (618*b*, 618*c*) may have a visual effect corresponding to the second group 604 and third group 606, shown in FIGS. 6B and 6C, respectively.

As shown in FIGS. 6A-6C, variable visual effect cursor (618*a*, 618*b*, 618*c*) may have a shape such as a 5-sided icon, but the shape of the cursor is not limited to the illustrated examples. Although FIGS. 6A-6C depict a variable visual effect cursor (618*a*, 618*b*, 618*c*) adopting a pentagon shape, it is to be understood that any other suitable shape such as a square, rectangle, disk, triangle, arrow, or any other shape or appearance that conveys a position on scroll bar 610 may be used. In some embodiments, a user input associated with "dragging" the variable visual effect cursor (618*a*, 618*b*, 618*c*) to a particular location along the scroll bar 610 may scroll the page to a corresponding particular location in the entire page. Additionally, in some embodiments, dragging the variable visual effect cursor (618*a*, 618*b*, 618*c*) may scroll the page with a scrolling speed higher than a scrolling speed associated to an initial scrolling signal or a continuous scrolling signal. In some embodiments, the scrolling speed may correspond to a ratio between a size of the entire page and a size of the scroll bar or size of the display. In some embodiments, the scrolling speed may be predetermined and fixed. In some embodiments, the scrolling speed may be determined dynamically based on user input.

In some embodiments, the variable visual effect cursor (618*a*, 618*b*, 618*c*) may be configured to disappear from the display 608 after a predetermined time period. In some embodiments, scroll bar 610 may be configured to disappear from display 608 after a predetermined time just after an initial or a continuous scrolling signal is completed, and variable visual effect cursor (618*a*, 618*b*, 618*c*) may be configured to disappear from the display 608 after a time less than or equal to the predetermined time. For example, if scroll bar is configured to disappear from the display after 2 seconds following last receipt of a scrolling signal, the variable visual effect cursor may disappear after 1 second, 1.5 seconds, or at 2 seconds to disappear simultaneously with the scroll bar.

In some embodiments, in response to at least one of the initial scrolling signal or the continued scrolling signal, at least one processor may be configured to cause a pop-up window to appear displaying a name of one of the plurality of groups of information associated with a current position of scrolling. In some embodiments, a visual effect of the pop-up window may correspond to the visual effect on the scroll bar associated with the particular group of information. In some embodiments, the pop-up window may be displayed at a location near the scroll bar at a position corresponding to the presented page. For example, the pop-up window may be adjacent the scroll bar, at a position along the scroll bar corresponding to a positioning of a group of information in the presented page. In the context of this description, a pop-up window may refer to a visual element that appears an overlay that is above an existing presented page on a screen. In some embodiments, content in the presented page may be rearranged around the pop-up window, so that content is not obscured by the pop-up window. Pop-up windows may appear in various sizes and positions on a display. In addition, pop-ups may present information and correspond to a GUI component with possible user interactions. In some embodiments, a pop-up window may appear next to or in place of the variable visual effect cursor of FIGS. 6A-6C.

Figure 7A:
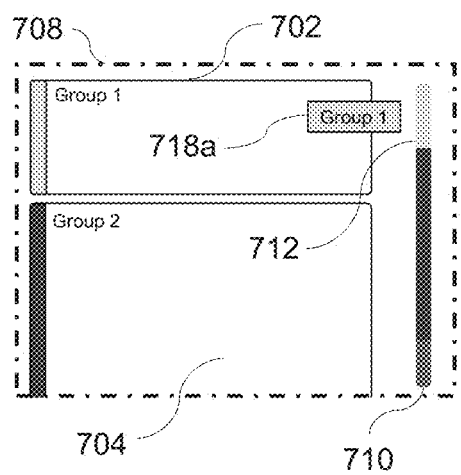
FIG. 7A is an illustration of an exemplary graphical user interface with a pop-up window, consistent with disclosed embodiments.
Figure 7B:
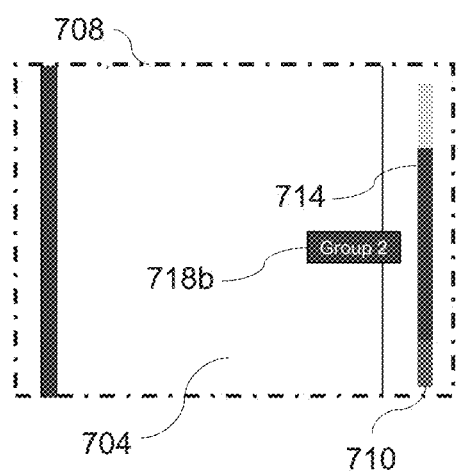
FIG. 7B is another illustration of an exemplary graphical user interface with a pop-up window, consistent with disclosed embodiments.

FIGS. 7A and 7B illustrate examples of a display 708 presenting a page having a plurality of groups of information, showing a representation of a scroll bar 710 divided into sections of differing visual effects, and a pop-up window (718*a*, 718*b*), consistent with the disclosed embodiments. As shown, the entire page is constituted by the same three groups of information (702, 704, 706). Differences between FIG. 7A and FIG. 7B include the page presented on the display 708, and a differing appearance and position of a pop-up window (718*a*, 718*b*) along scroll bar 710. As shown in FIG. 7A, the presented page corresponds to the first group of information 702, and pop-up window 718*a* is displayed adjacent to a position along scroll bar 710 in first section 712. Consistent with the description of the variable visual effect cursor, pop-up window 718*a* is assigned a visual effect corresponding to the visual effect assigned to the first group 702. As shown in FIG. 7A, pop-up window 718*a* may also display identifying information about first group 702, such as a name or title of the first group 702. In FIG. 7B the presented page may correspond to the second group of information 704 due to a scroll, and accordingly, pop-up window 718*b* may be located adjacent to a position along the scroll bar 710 in second section 714, where the position in second section 714 corresponds to the displayed portion of the second group 704. As shown, pop-up window 718*b* may adopt a visual effect corresponding to the visual effect assigned to the second group 704. Similar to pop-up window 718*a*, pop-up window 718*b* may display identifying information about second group 704, such as a name or title of the second group 704.

Although FIGS. 7A and 7B illustrate a pop-up window (718*a*, 718*b*) adopting a rectangular shape, it is to be understood that any other suitable shape such as an oval, a speech bubble, a square etc. may be used. It is also to be understood that different ways of implementing the visual effect in the pop window may be possible. As discussed above, in some embodiments, the visual effect of the pop-up window may correspond to a visual effect of a text displayed in the pop-up window. For example, a color and/or texture of the pop-up window may correspond to the visual effect of the corresponding group of information. In some embodiments, the pop-up window may have a different color, including a fixed color, and information displayed in the pop-up window, such as text displayed in the pop-up window, may have a color and/or texture corresponding to the visual effect of the corresponding group of information.

In some embodiments, the pop-up window (718*a*, 718*b*) may be configured to disappear from the display 708 after a predetermined time. In some other embodiments, wherein the scroll bar 610 is configured to disappear from the display 708 after a predetermined time, the pop-up window (718*a*, 718*b*) may be configured to disappear from the display 708 after a time less than or equal to the predetermined time.

In some embodiments, a variable visual effect cursor, such as the one described above, may be displayed in conjunction with the pop-up window. For example, after receiving at least one of the initial scrolling signal or the continued scrolling signal, both a pop window and a variable effect cursor may be displayed. In some embodiments, an input associated with dragging the variable visual effect cursor (such as the cursor shown in FIGS. 6A-6C) in a direction different than the scroll direction, such as dragging the cursor in a direction perpendicular to a length of the scroll bar, may cause the display of a pop-up window such as the one described above to be displayed. For instance, in the example shown in FIG. 6A, an input associated with selecting and/or horizontally dragging the variable visual effect cursor 618*a* may cause display of a pop window similar to the one illustrated in FIG. 7A (718*a*). The pop-up window may be displayed in place of the cursor, resulting in an appearance similar to FIG. 7A or 7B. Alternatively, the pop-up window may be displayed near the cursor (not shown).

In some embodiments, in response to the detection of the initial scrolling signal or the continuous scrolling signal, at least one processor may trigger a haptic signal at a transition from one of the plurality of groups of information to an adjacent one of the plurality of groups of information. Haptic signals can include any type of communication signal related to the sense of touch. Haptic signals may be implemented in a device in many ways. For example, a device can interact with a user by applying tactile, vibrotactile, electrotactile, thermal, force feedback, or any other type of feedback that can be felt by a user. Additionally, or alternatively, a sound effect may be triggered at the transitions from one of the groups of information to an adjacent group of information.

Figure 8:
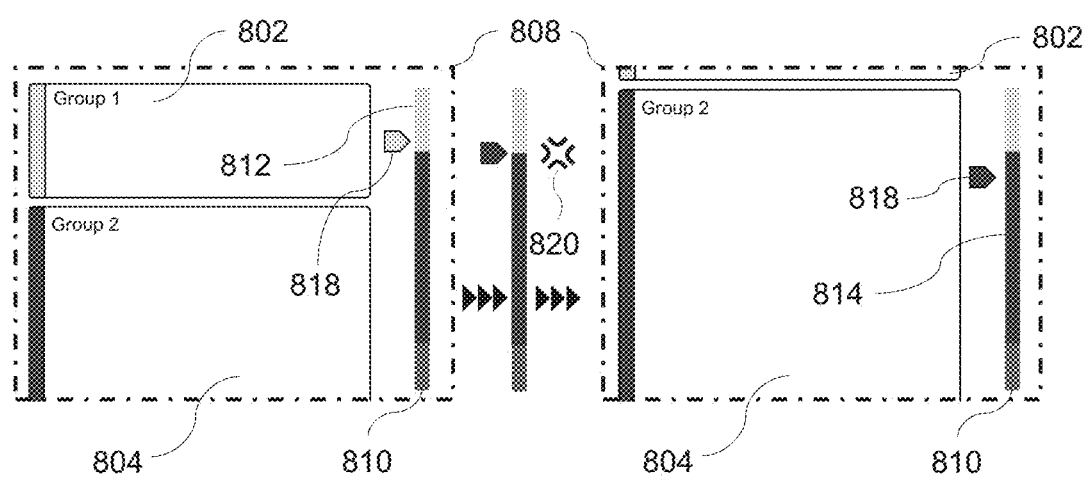
FIG. 8 is a diagram of a transition in an exemplary graphical user interface that triggers a haptic signal, consistent with disclosed embodiments.

FIG. 8 illustrates an exemplary presentation of a page having one or more groups of information on a display 808. At the right hand of display 808, a scroll bar 810 is divided into sections of differing visual effects that correspond to the plurality of groups of information in the entire page. As shown on the left side of FIG. 8, the presented page includes a first group of information 802 and a second group of information 804, and a variable visual effect cursor 818 positioned along scroll bar 810 adjacent to section 812. In the example shown, section 812 corresponds to the first group of information 802, and section 814 corresponds to the second group of information 804. A scrolling signal may cause the presented page to scroll and transition from the left-hand appearance to the appearance shown on the right, in which the presented page corresponds to the second group of information 804. During the scroll, variable visual effect cursor 818 may move along scroll bar 810 from section 812 to section 814. Between the two situations illustrated on FIG. 8, a transition occurs between the first 802 and second 804 groups of information being displayed, and a haptic signal may be triggered at this transition indicating a transition between two different groups of information. In the example shown, in response to the variable visual effect cursor 818 transitioning from first section 812 to second section 814, a haptic signal 820 may be triggered. Additionally, or alternatively, a sound effect may be triggered at the transitions from one of the groups of information to an adjacent group of information. As a non-limiting example, a click or tick sound may replace or supplement the triggered haptic signal.

In some embodiments, at least one processor may determine that the length of one of the sections is smaller than a predetermined length threshold. During scrolling in the one of the sections, the at least one processor may cause display of an enlarged version of the one of the sections. In some embodiments, the enlarged version may be presented adjacent to the scroll bar. An enlarged version of a section may refer to a version of the section where at least one of the dimensions of the section has been increased beyond an original dimension of the section in the scroll bar as it was originally displayed. For example, an enlarged version of a section may correspond to the display of the section with either an increased length, width or both dimensions. In some embodiments, the predetermined threshold may include at least one of a predetermined percentage of a primary dimension of the scroll bar, a predetermined number of pixels of the display, or may be manually defined by a user input.

Figure 9A:
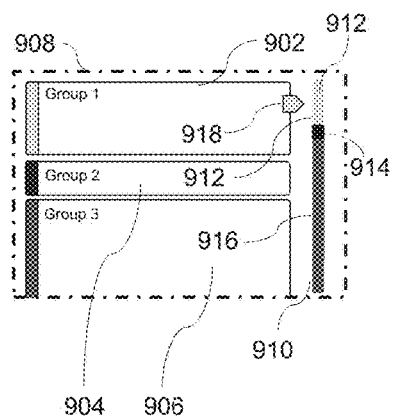
FIG. 9A is an illustration of an exemplary graphical user interface with a scroll bar section that is smaller than a predetermined threshold, consistent with disclosed embodiments.
Figure 9B:
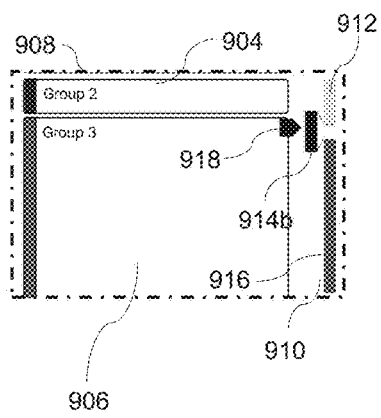
FIG. 9B is another illustration of an exemplary graphical user interface with a scroll bar section that is smaller than a predetermined threshold, consistent with disclosed embodiments.
Figure 9C:
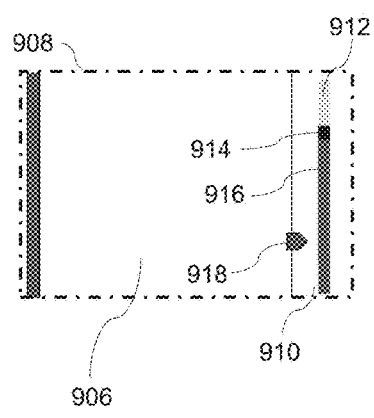
FIG. 9C is another illustration of an exemplary graphical user interface with a scroll bar section that is smaller than a predetermined threshold, consistent with disclosed embodiments.

FIGS. 9A-9C illustrate examples of graphical user interfaces with scroll bars consistent with disclosed embodiments. As shown, a page is presented with a plurality of groups of information (a first group 902, second group 904, and third group 906), and a scroll bar 910 is divided into sections of differing visual effects corresponding to each of the groups. For these figures, the entire page is made up of three groups of information (902, 904, 906), and the presented page differs between FIGS. 9A, 9B, and 9C, with differences in the appearance and position of a variable visual effect cursor 918 (similar to the cursor described above) along the scroll bar 910 and in the appearance of scroll bar 910. The second group 904 has an associated size smaller than the two other groups (902, 906), as a result, the length of the corresponding section 914 may be smaller than a predetermined threshold. A processor may determine that the size of section 914 is less than a predetermined threshold, based on a dimension of section 914 or other stored information indicative of the section size.

In FIG. 9A, the presented page corresponds to the first group of information 902, accordingly, the variable visual effect cursor 918 is located at a position along scroll bar 910 next to the first section 912. In FIG. 9B, the presented page is scrolled to move the second group of information 904 to the top of the presented page. The length of the corresponding section 914, being proportional to the associated size of the second group 904, may be determined to be smaller than a predetermined threshold (for example, less than 10% of the total vertical dimension of scroll bar 910). In response to this determination, at least one processor may generate and display an enlarged version (914*b*) of section 914 along the scroll bar 910. In this example, enlarged version 914*b* may be displayed in an expanded view of the scroll bar 910, such as by displaying enlarged version 914*b* adjacent a position of section 914. Variable visual effect cursor 918 may be displayed along the enlarged version of section 914. In some embodiments, a position of the variable visual effect cursor 918 along the enlarged version of the section may be proportional to a portion of the corresponding group of information displayed on the presented page. As such, a higher proportionality factor may be applied for the enlarged version 914*b* compared to the other sections (912, 916).

In response to a continuous scroll signal that scrolls past the second group 904 and into section 916 corresponding to the third group 906, enlarged version 914*b* may disappear or revert to section 914, as shown in FIG. 9C. As shown the presented page corresponds to the third group of information 906, accordingly, the variable visual effect cursor 918 may be located along scroll bar 910 adjacent a corresponding position in third section 916.

In some embodiments, a processor may determine that the length of one of the sections is smaller than a predetermined length threshold, and during scrolling in the one of the sections, may cause display of an enlarged version of the one of the sections within the scroll bar, rather than adjacent to the scroll bar. Referring to FIG. 9B, instead of displaying the enlarged version 914*b* of section 914 adjacent to the scroll bar 910, enlarged version 914*b* may be displayed within scroll bar 910, squeezing or displacing the other sections (912, 916). In some embodiments, enlarged version 914*b* may be superimposed over section 914. As such, a higher proportionality factor may be applied for scrolling within expanded section 914*b*, and a lower proportionality factor may be applied for scrolling other sections (912, 916), similar to a proportionality factor applied during scrolling before scrolling section 914.

Figure 10A:
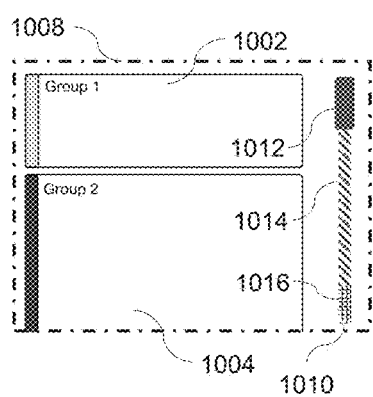
FIG. 10A is an illustration of an exemplary graphical user interface with a scroll bar section having a modified visual appearance, consistent with disclosed embodiments.
Figure 10B:
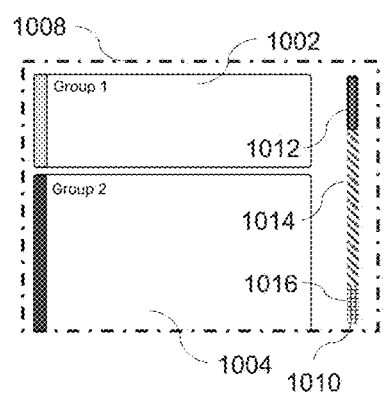
FIG. 10B is another illustration of an exemplary graphical user interface with a scroll bar section having a modified visual appearance, consistent with disclosed embodiments.
Figure 10C:
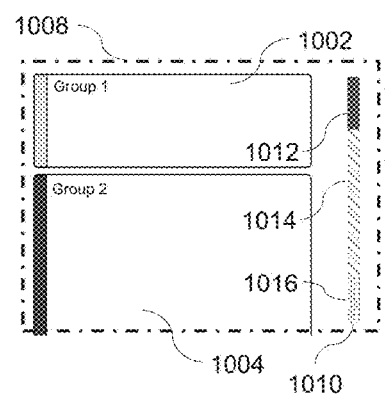
FIG. 10C is another illustration of an exemplary graphical user interface with a scroll bar section having a modified visual appearance, consistent with disclosed embodiments.

In some embodiments, during scrolling of one of the sections, a processor may be configured to modify a visual appearance of the one of the sections, such as by increasing a width of the one of the sections. Modifying a visual appearance of a section may include changing any type of visual characteristics of the section resulting in a different visual representation of the section. FIGS. 10A-10C illustrate a presented page with a first group of information 1002 and a second group of information 1004. Although not shown on the presented page, the entire page may also include a third group of information. A scroll bar may be divided into sections of differing visual effects, including first section 1012 corresponding to first group 1002, second section 1014 corresponding to the second section 1004, and third section 1016 corresponding to the third group (not shown).

In some embodiments, one of the sections that is currently being scrolled through may have a modified visual appearance. In some embodiments such as the embodiment shown in FIG. 10A, the visual appearance of the one of the sections may be modified by increasing a width of the one of the sections. As illustrated in FIG. 10A, section 1012 currently being scrolled corresponds to the first group of information 1002. During scrolling through the first group 1002, a width of section 1012 may be increased relative to the width of scroll bar 1010 and the width of the other sections (1014, 1016), thereby enhancing the user's experience and ability to quickly identify the section of scroll bar 910 that is currently being scrolled. As a result, a user may be able to more quickly and easily understand what portion of the entire page is currently being navigated. In some embodiments, modifying the visual appearance of the one of the sections may include changing an appearance of the contour of the one of the sections. Referring to FIG. 10B, the section 1012 currently being scrolled corresponds to the first group of information 1002, and a contour of section 1012 may be emphasized or highlighted by using a an outline, shadow, or glow, thereby further distinguishing first section 1012 from the other sections (1014, 1016). As another example, modifying the visual appearance of the one of the sections may include adjusting an opacity or transparency of one or more sections. For example, an opacity of the one of the sections may be maintained, while reducing the opacity of sections other than the one of the sections, thereby increasing a transparency of those other sections. For example, as illustrated in FIG. 10C, section 1012 is currently being scrolled and corresponds to the first group of information 1002. An opacity of the visual effect of section 1012 may be maintained while reducing the opacity of the other sections (1014, 1016), distinguishing first section 1012 from the other sections (1014, 1016). If the presented page includes content that is normally obscured by the scroll bar 1010, then reducing an opacity (or increasing transparency) may cause the obscured content to become visible or partially visible. Although FIGS. 10A-10C depict three exemplary processes modifying the appearance of section 1012, any other suitable visual characteristics of section 1012 may be changed, in order to visually distinguish first section 1012 from the other sections (1014, 1016).

Figure 11:
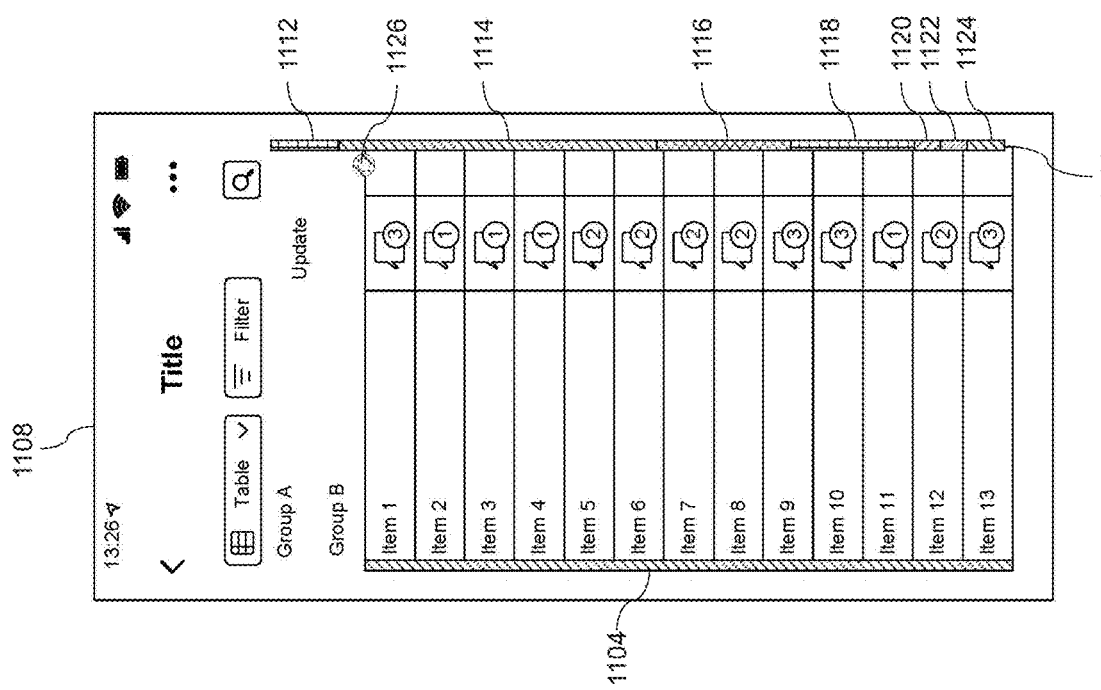
FIG. 11 is an illustration of an exemplary graphical user interface with a plurality of groups of information presented on a screen, a scroll bar divided into sections of different visual effects, and a cursor, consistent with disclosed embodiments.

FIG. 11 is an illustration of another exemplary graphical user interface consistent with disclosed embodiments. As shown, the presented page shown in FIG. 11 includes a group of information 1104 ("Group B"), a scroll bar 1110 is located on the right side of the display 1108, divided into sections (1112, 1114, 1116, 1118, 1120, 1122, and 1124), each section having a different and unique visual effect, portrayed using texture patterns in this example. In this example, display 1108 may be a smartphone or tablet device screen. A variable visual effect cursor 1126 is positioned adjacent section 1114 of scroll 1110 bar, at a position that corresponds to scrolling in group 1104. Cursor 1126 is depicted near the top of section 1114, indicating to a user that the presented page represents content near the top of Group B. Groups of information in this example may correspond to a data table comprising a plurality of rows and columns, as shown. The cumulative size of all the groups of information (here seven groups represented by sections 1112-1124) is larger than the two dimensions of the smartphone screen 1108. In the displayed example, a second and horizontal standard scroll bar (not displayed in FIG. 11) may be provided in order to allow for horizontal scrolling of the table content.

Figure 12:
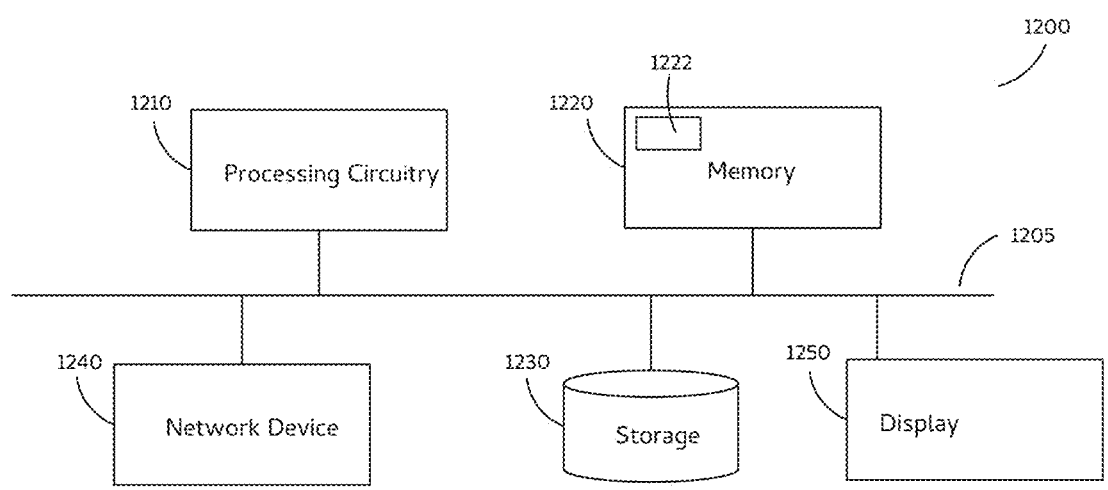
FIG. 12 is a block diagram of an exemplary computing device which may be employed in connection with embodiments of the present disclosure.

FIG. 12 is a block diagram of an exemplary computing device 1200 consistent with some embodiments. In some embodiments, computing device 1200 may be similar in type and function to user device 1320, discussed with respect to FIG. 13. As shown in FIG. 12, computing device 1200 may include processing circuitry 1210, such as, for example, a central processing unit (CPU). In some embodiments, the processing circuitry 1210 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 1210 may be coupled via a bus 1205 to a memory 1220.

The memory 1220 may further include a memory portion 1222 that may contain instructions that when executed by the processing circuitry 1210, may perform the method described in more detail herein. The memory 1220 may be further used as a working scratch pad for the processing circuitry 1210, a temporary storage, and others, as the case may be. The memory 1220 may be a volatile memory such as, but not limited to, random access memory (RAM), or non-volatile memory (NVM), such as, but not limited to, flash memory. The processing circuitry 110 may be further connected to a network device 1240, such as a network interface card, for providing connectivity between the computing device 1200 and a network, such as a network 1310, discussed in more detail with respect to FIG. 13 below. The processing circuitry 1210 may be further coupled with a storage device 1230. The storage device 1230 may be used for the purpose of storing single data type column-oriented data structures, data elements associated with the data structures, or any other data structures. While illustrated in FIG. 12 as a single device, it is to be understood that storage device 1230 may include multiple devices either collocated or distributed.

The processing circuitry 1210 and/or the memory 1220 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

In some embodiments, computing device 1200 may include one or more input and output devices (not shown in figure). Computing device may also include a display 1250, such as a touchscreen display or other display types discussed herein.

Figure 13:
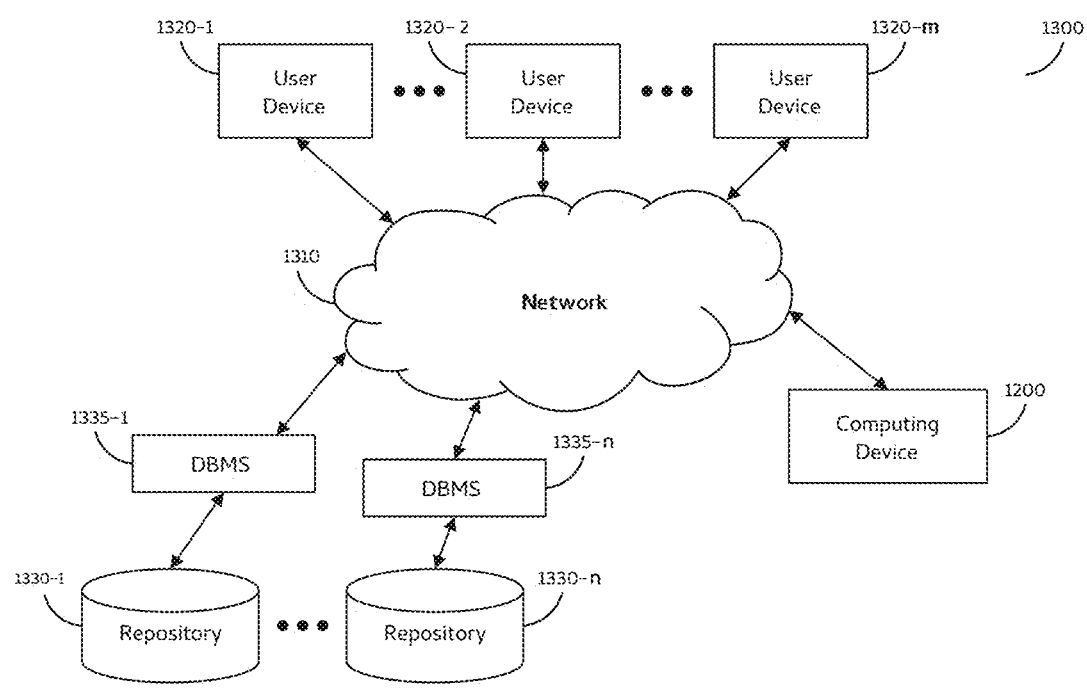
FIG. 13 is a block diagram of an exemplary computing architecture for collaborative work systems, consistent with embodiments of the present disclosure.

FIG. 13 is a block diagram of computing architecture 1300 that may be used in connection with various disclosed embodiments. The computing device 1200, as described in connection with FIG. 12, may be coupled to network 1310. The network 1310 may enable communication between different elements that may be communicatively coupled with the computing device 1200, as further described below. The network 1310 may include the Internet, the world-wide-web (WWW), a local area network (LAN), a wide area network (WAN), a metro area network (MAN), and other networks capable of enabling communication between the elements of the computing architecture 1300. In some disclosed embodiments, the computing device 1200 may be a server deployed in a cloud computing environment.

One or more user devices 1320-1 through user device 1320-*m*, where 'm' in an integer equal to or greater than 1, referred to individually as user device 1320 and collectively as user devices 1320, may be communicatively coupled with the computing device 1200 via the network 1310. A user device 1320 may be for example, a smart phone, a mobile phone, a laptop, a tablet computer, a wearable computing device, a personal computer (PC), a smart television and the like. A user device 1320 may be configured to send to and receive from the computing device 1200 data and/or metadata associated with a variety of elements associated with single data type column-oriented data structures, such as columns, rows, cells, schemas, and the like.

One or more data repositories 1330-1 through data repository 1330-*n*, where 'n' in an integer equal to or greater than 1, referred to individually as data repository 1330 and collectively as data repository 1330, may be communicatively coupled with the computing device 1200 via the network 1310, or embedded within the computing device 1200. Each data repository 1330 may be communicatively connected to the network 1310 through one or more database management services (DBMS) 1335-1 through DBMS 1335-*n*. The data repository 1330 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 1200.

The embodiments disclosed herein are exemplary and any other means for performing and facilitating display navigation operations may be consistent with this disclosure.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a touch-sensitive layer such as a touchscreen, or keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A non-transitory computer-readable medium containing instructions that, when executed, cause at least one processor to perform display navigation operations, the operations comprising:
presenting a plurality of groups of information on a display, in a form of a page, each of the plurality of groups of information having an associated size, wherein a cumulative size of the plurality of groups of information is larger than at least one dimension of the display;
receiving an initial scrolling signal for causing the presented page to scroll on the display;
augmenting the display with a scroll bar divided into sections of differing visual effects, wherein
the differing visual effects of each of the sections correspond to an associated visual effect assigned to one group of the plurality of groups of information,
a length of each of the sections is proportional to the associated size of the one group relative to the cumulative size of the plurality of groups,
an order of the visual effects in the scroll bar corresponds to an order of the groups of information in the presented page, and
each section of the scroll bar is directly associated with each group of information;
responsive to detection of the initial scrolling signal, augmenting the display with a variable visual effect cursor located adjacent to the scroll bar;
during scrolling within a particular group of information, displaying a visual effect of the variable visual effect cursor that corresponds to a visual effect on the scroll bar section associated with the particular group of information; and
in response to detecting a dragging of the variable visual effect cursor to a particular location along the scroll bar, causing the page to scroll to a corresponding particular location in the entire page.

2. The non-transitory computer-readable medium of claim 1, wherein all of the sections are presented on the display while the scroll bar is presented.

3. The non-transitory computer-readable medium of claim 1, wherein
an entire page includes the presented page and one or more groups of information that are not displayed in the presented page, and
an interaction with a particular location on the scroll bar scrolls the page to a corresponding particular location in the entire page.

4. The non-transitory computer-readable medium of claim 1, wherein the differing visual effects include a unique color associated with each group of the plurality of groups of information, or a unique combination of a color and a texture associated with each group of the plurality of groups of information.

5. The non-transitory computer-readable medium of claim 4, wherein the operations further comprise:
responsive to a determination that a same color is assigned to more than one of the plurality of groups of information, assigning a different texture to each group of the plurality of groups of information having the same color.

6. The non-transitory computer-readable medium of claim 1, wherein each of the plurality of groups of information has a predetermined visual effect.

7. The non-transitory computer-readable medium of claim 1, wherein the operations further comprise:
responsive to a determination that one of the plurality of groups of information was not assigned with a visual effect prior to the scroll, assigning a random visual effect to the one of the plurality of groups of information, different from other visual effects assigned to another group of information.

8. The non-transitory computer-readable medium of claim 1, wherein the operations further comprise:
responsive to a determination that elements from different groups of information are combined to form a new group of information, assigning to the new group of information a visual effect that corresponds to a combination of visual effects of the different groups of information from which the elements originate.

9. The non-transitory computer-readable medium of claim 1, wherein the operations further comprise:
receiving a continued scrolling signal following the initial scrolling signal; and
in response to the continued scrolling signal, cause the page to scroll on the display while maintaining a static position of the scroll bar on the display.

10. The non-transitory computer-readable medium of claim 9, wherein the operations further comprise:
responsive to at least one of the initial scrolling signal or the continued scrolling signal, causing a pop-up window to appear displaying a name of one of the plurality of groups of information associated with a current position of scrolling,
wherein a visual effect of a text displayed in the pop-up window corresponds to the visual effect on the scroll bar associated with the particular group of information.

11. The non-transitory computer-readable medium of claim 1, wherein the operations further comprise:
responsive to detection of the initial scrolling signal, augmenting the display with a variable visual effect cursor located near the scroll bar;
during scrolling within a particular group of information, displaying a visual effect of the variable visual effect cursor that corresponds to the visual effect on the scroll bar associated with the particular group of information; and,
in response to detecting a dragging of the variable visual effect cursor to a particular location along the scroll bar, cause the page to scroll to a corresponding particular location in the entire page.

12. The non-transitory computer-readable medium of claim 1, wherein the operations further comprise:
responsive to detection of the initial scrolling signal, triggering a haptic signal at a transition from one of the plurality of groups of information to an adjacent one of the plurality of groups of information.

13. The non-transitory computer-readable medium of claim 1, wherein the operations further comprise:
determining that the length of one of the sections is smaller than a predetermined length threshold; and
during scrolling in the one of the sections, causing display of an enlarged version of the one of the sections, wherein the enlarged version is presented adjacent to the scroll bar.

14. The non-transitory computer-readable medium of claim 1, wherein the operations further comprise, during scrolling of one of the sections, increasing a width of the one of the sections.

15. The non-transitory computer-readable medium of claim 1, wherein the variable visual effect cursor is configured to disappear from the display after a predetermined time period.

16. A method for display navigation, comprising:
presenting a plurality of groups of information on a display, in a form of a page, each of the plurality of groups of information having an associated size, wherein a cumulative size of the plurality of groups of information is larger than at least one dimension of the display;
receiving an initial scrolling signal for causing the presented page to scroll on the display;
augmenting the display with a scroll bar divided into sections of differing visual effects,
wherein
the differing visual effects of each of the sections correspond to an associated visual effect assigned to one group of the plurality of groups of information,
a length of each of the sections is proportional to the associated size of the one group relative to the cumulative size of the plurality of groups,
an order of the visual effects in the scroll bar corresponds to an order of the groups of information in the presented page, and each section of the scroll bar is directly associated with each group of information;
responsive to detection of the initial scrolling signal, augmenting the display with a variable visual effect cursor located adjacent to the scroll bar;
during scrolling within a particular group of information, displaying a visual effect of the variable visual effect cursor that corresponds to a visual effect on the scroll bar section associated with the particular group of information; and
in response to detecting a dragging of the variable visual effect cursor to a particular location along the scroll bar, causing the page to scroll to a corresponding particular location in the entire page.

17. The method of claim 16, further comprising:
responsive to detection of the initial scrolling signal, augmenting the display with a variable visual effect cursor located near the scroll bar;
during scrolling within a particular group of information, displaying a visual effect of the variable visual effect cursor that corresponds to the visual effect on the scroll bar associated with the particular group of information; and,
in response to detecting a dragging of the variable visual effect cursor to a particular location along the scroll bar, cause the page to scroll to a corresponding particular location in the entire page.

18. The method of claim 16, further comprising:
determining that the length of one of the sections is smaller than a predetermined length threshold; and
during scrolling in the one of the sections, causing display of an enlarged version of the one of the sections, wherein the enlarged version is presented adjacent to the scroll bar.

19. A system for performing display navigation operations on a display having dimensions smaller than a page presented on the display, the system comprising:
a memory storing instructions; and
at least one processor that executes the stored instructions to:
present a plurality of groups of information on a display, in a form of a page, each of the plurality of groups of information having an associated size, wherein a cumulative size of the plurality of groups of information is larger than at least one dimension of the display;
receive an initial scrolling signal for causing the presented page to scroll on the display;
augment the display with a scroll bar divided into sections of differing colors,
wherein
each of the sections is colored in a differing color assigned to one group of the plurality of groups of information,
a length of each of the sections is proportional to the associated size of the one group relative to the cumulative size of the plurality of groups,
an order of the colors in the scroll bar corresponds to an order of the groups of information in the presented page, and
each section of the scroll bar is directly associated with each group of information;
responsive to detection of the initial scrolling signal, augment the display with a variable color cursor located adjacent to the scroll bar;
during scrolling within a particular group of information, display a color of the variable color cursor that corresponds to a color on the scroll bar section associated with the particular group of information; and in response to detecting a dragging of the variable color cursor to a particular location along the scroll bar, cause the page to scroll to a corresponding particular location in the entire page.

20. The system of claim 19, wherein the at least one processor is further configured to:

responsive to detection of the initial scrolling signal, augmenting the display with a variable color cursor located near the scroll bar;

during scrolling within a particular group of information, displaying a color of the variable color cursor that corresponds to a color of the scroll bar section associated with the particular group of information; and, in response to detecting a dragging of the variable color cursor to a particular location along the scroll bar, cause the page to scroll to a corresponding particular location in the entire page.

* * * * *